US009647910B2

(12) United States Patent
Ishida et al.

(10) Patent No.: US 9,647,910 B2
(45) Date of Patent: May 9, 2017

(54) MANAGEMENT SERVER AND CONTROL METHOD OF THE MANAGEMENT SERVER FOR MANAGING A SERVICE SYSTEM VIRTUALLY BUILT USING CONNECTED COMPONENTS

(71) Applicant: Hitachi, Ltd., Tokyo (JP)

(72) Inventors: Haruhisa Ishida, Tokyo (JP); Tomoya Oota, Tokyo (JP); Yoshiko Yasuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 14/568,542

(22) Filed: Dec. 12, 2014

(65) Prior Publication Data

US 2015/0172148 A1 Jun. 18, 2015

(30) Foreign Application Priority Data

Dec. 16, 2013 (JP) ................................. 2013-258798

(51) Int. Cl.
*G06F 11/34* (2006.01)
*H04L 12/26* (2006.01)
(Continued)

(52) U.S. Cl.
CPC ............ *H04L 43/045* (2013.01); *G06F 9/455* (2013.01); *G06F 9/5072* (2013.01);
(Continued)

(58) Field of Classification Search
CPC H04L 43/045; H04L 41/5009; H04L 41/5096
See application file for complete search history.

(56) References Cited

U.S. PATENT DOCUMENTS 6,598,075 B1 * 7/2003 Ogdon ................ H04L 12/1813
348/E7.083
6,978,232 B1 * 12/2005 Tobler .................... H04L 67/02
703/21
(Continued)

FOREIGN PATENT DOCUMENTS

WO WO 2010/032701 A1 3/2010

OTHER PUBLICATIONS

Buyya, Rajkumar, Rajiv Ranjan, and Rodrigo N. Calheiros. "Intercloud: Utility-oriented federation of cloud computing environments for scaling of application services." International Conference on Algorithms and Architectures for Parallel Processing. Springer Berlin Heidelberg, 2010.*

(Continued)

*Primary Examiner* — Jimmy H Tran
(74) *Attorney, Agent, or Firm* — Foley & Lardner LLP

(57) ABSTRACT

Methods and apparatuses for managing a service system virtually built are provided. A management server assigns identifiers that are unique to a service system to components used to build the service system, and records connections of the components and the time of building the service system. When detecting a change in the connections of the components, the management server records the changed connection and the time of the change, collects monitoring information and monitoring times from a data center, and records the monitoring information associated with the monitoring times. When receiving information designating a time from a terminal, the management server identifies and outputs the configuration of the service system and the monitoring information at the designated time based on the identifiers of the components associated with the designated time.

15 Claims, 24 Drawing Sheets

(51) Int. Cl.
*G06F 9/455* (2006.01)
*G06F 9/50* (2006.01)
*H04L 12/24* (2006.01)
*H04L 29/08* (2006.01)

(52) U.S. Cl.
CPC ...... H04L 41/0806 (2013.01); H04L 41/0853 (2013.01); H04L 41/12 (2013.01); H04L 41/5054 (2013.01); H04L 41/5096 (2013.01); H04L 43/0817 (2013.01); *G06F 11/3409* (2013.01); *G06F 11/3438* (2013.01); *G06F 11/3495* (2013.01); *G06F 2209/508* (2013.01); *H04L 41/048* (2013.01); *H04L 41/0859* (2013.01); *H04L 41/5009* (2013.01); *H04L 67/10* (2013.01)

(56) References Cited

U.S. PATENT DOCUMENTS

| | | | | |
|---|---|---|---|---|
| 7,080,378 | B1 * | 7/2006 | Noland | G06F 9/5083 709/224 |
| 7,356,679 | B1 * | 4/2008 | Le | G06F 17/30067 707/E17.01 |
| 7,383,327 | B1 * | 6/2008 | Tormasov | H04L 41/082 709/220 |
| 9,110,496 | B1 * | 8/2015 | Michelsen | G06F 1/00 |
| 9,384,227 | B1 * | 7/2016 | Xiao | G06F 17/30584 |
| 2001/0052016 | A1 * | 12/2001 | Skene | G06F 9/505 709/226 |
| 2004/0078467 | A1 * | 4/2004 | Grosner | G06F 17/30067 709/226 |
| 2005/0120160 | A1 * | 6/2005 | Plouffe | G06F 9/45537 711/1 |
| 2005/0210067 | A1 * | 9/2005 | Nakatani | G06F 17/30067 |
| 2007/0179955 | A1 * | 8/2007 | Croft | G06F 3/1415 |
| 2007/0233455 | A1 * | 10/2007 | Zimmer | G06F 9/546 703/27 |
| 2008/0034416 | A1 * | 2/2008 | Kumar | H04L 63/0272 726/15 |
| 2008/0049786 | A1 * | 2/2008 | Ram | G06F 9/5083 370/468 |
| 2009/0249284 | A1 * | 10/2009 | Antosz | G06F 8/10 717/104 |
| 2009/0327489 | A1 * | 12/2009 | Swildens | G06F 9/505 709/224 |
| 2011/0276951 | A1 * | 11/2011 | Jain | G06F 11/3006 717/140 |
| 2012/0089724 | A1 * | 4/2012 | Liang | G06F 11/328 709/224 |
| 2012/0265863 | A1 * | 10/2012 | von Eicken | H04L 67/00 709/220 |
| 2013/0060933 | A1 * | 3/2013 | Tung | G06F 11/3495 709/224 |
| 2013/0304904 | A1 * | 11/2013 | Mouline | H04L 43/045 709/224 |
| 2014/0173363 | A1 * | 6/2014 | Kato | G06F 11/0709 714/47.3 |
| 2014/0282525 | A1 * | 9/2014 | Sapuram | G06Q 30/0631 718/1 |
| 2015/0188927 | A1 * | 7/2015 | Santhi | H04L 63/104 726/4 |
| 2015/0227598 | A1 * | 8/2015 | Hahn | G06F 17/3007 707/722 |

OTHER PUBLICATIONS

Hyser, Chris, et al. "Autonomic virtual machine placement in the data center." Hewlett Packard Laboratories, Tech. Rep. HPL-2007-189 (2007): 2007-189.*

Liu, Liang, et al. "GreenCloud: a new architecture for green data center."Proceedings of the 6th international conference industry session on Autonomic computing and communications industry session. ACM, 2009.*

Singh, Aameek, Madhukar Korupolu, and Dushmanta Mohapatra. "Server-storage virtualization: integration and load balancing in data centers."Proceedings of the 2008 ACM/IEEE conference on Supercomputing. IEEE Press, 2008.*

Hasselmeyer, Peer, and Nico d'Heureuse. "Towards holistic multi-tenant monitoring for virtual data centers." Network Operations and Management Symposium Workshops (NOMS Wksps), 2010 IEEE/IFIP. IEEE, 2010.*

* cited by examiner

(a-1) COMPONENT INFORMATION TABLE FOR VIRTUAL MACHINES

| COMPONENT ID | TIME | DESIGN INFORMATION | | ... |
| --- | --- | --- | --- | --- |
| | | SITE TYPE | IP ADDRESS | |
| 1 | 2013 4/1 00:00 | SITE 0 | 192.168.100.100 | ... |
| 2 | 2013 4/1 00:00 | SITE 1 | 10.0.0.100 | ... |
| ... | ... | ... | ... | ... |

(a-2) COMPONENT INFORMATION TABLE FOR NETWORK SEGMENTS

| COMPONENT ID | TIME | DESIGN INFORMATION | | ... |
| --- | --- | --- | --- | --- |
| | | SITE TYPE | CIDR | |
| 10 | 2013 4/1 00:00 | SITE 0 | 192.168.100/24 | ... |
| 11 | 2013 4/1 00:00 | SITE 1 | 10.0.0/24 | ... |
| ... | ... | ... | ... | ... |

(a-3) COMPONENT INFORMATION TABLE FOR VPN GATEWAYS

| COMPONENT ID | TIME | DESIGN INFORMATION | | ... |
| --- | --- | --- | --- | --- |
| | | SITE TYPE | IP ADDRESS | |
| 20 | 2013 4/1 00:00 | SITE 0 | 192.168.100.205 | ... |
| 21 | 2013 4/1 00:00 | SITE 1 | 10.0.0.16 | ... |
| ... | ... | ... | ... | ... |

(a) COMPONENT INFORMATION TABLES 141

(b) COMPONENT CONNECTION INFORMATION TABLE 142

| COMPONENT ID | TIME | CONNECTION ORIGIN COMPONENT | | CONNECTION DESTINATION COMPONENT | |
| --- | --- | --- | --- | --- | --- |
| | | COMPONENT ID | TIME | COMPONENT ID | TIME |
| 100 | 2013 4/1 00:00 | 20 | 2013 4/1 00:00 | 21 | 2013 4/1 00:00 |
| ... | ... | ... | ... | ... | ... |

CONFIGURATION INFORMATION MANAGEMENT TABLE 140

*Fig. 4*

| TYPE | CONNECTION ORIGIN IP ADDRESS | CONNECTION DESTINATION IP ADDRESS | REFERENCE AT DETECTION OF CHANGE |
|---|---|---|---|
| VPN CONNECTION | 10.0.0.16 | 192.168.100.205 | O |
| LOAD BALANCER CONNECTION | 10.0.0.100 | 10.0.0.101 | × |
|  |  | 10.0.0.102 |  |
| APPLICATION CONNECTION | 10.0.0.101 | 192.168.100.100 | O |
| ... | ... | ... | ... |

TENANT INITIAL CONNECTION TABLE 153

Fig. 5

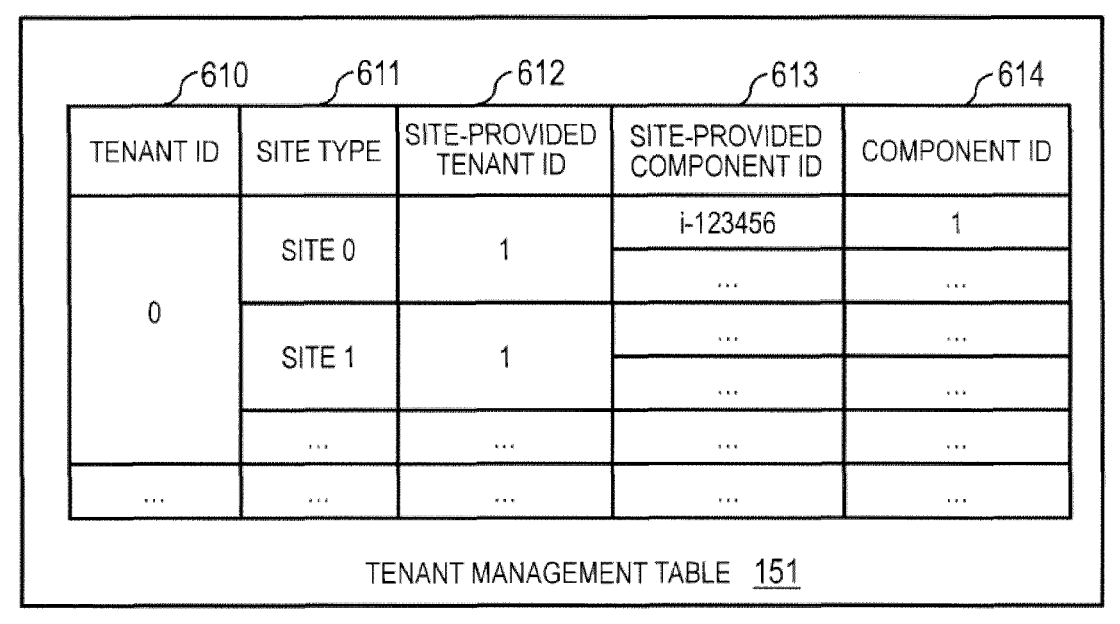

| TENANT ID | SITE TYPE | SITE-PROVIDED TENANT ID | SITE-PROVIDED COMPONENT ID | COMPONENT ID |
|---|---|---|---|---|
| 0 | SITE 0 | 1 | i-123456 | 1 |
| | | | ... | ... |
| | SITE 1 | 1 | ... | ... |
| | | | ... | ... |
| | ... | ... | ... | ... |
| ... | ... | ... | ... | ... |

TENANT MANAGEMENT TABLE 151

*Fig. 6*

(a) PERFORMANCE INFORMATION TABLE 161

| COMPONENT ID (711) | TIME (712) | METRIC NAME (714) | METRIC VALUE (715) |
|---|---|---|---|
| 1 | 2013 4/1 10:00 | CPU USAGE | 50% |
| ... | ... | ... | ... |

(b) EVENT INFORMATION TABLE 162

| COMPONENT ID (721) | TIME (722) | EVENT (723) |
|---|---|---|
| 1 | 2013 4/1 9:55:00 | CREATION |
| ... | ... | ... |

(c) LOG INFORMATION TABLE 163

| COMPONENT ID (731) | TIME (732) | LOG TYPE (734) | LOG (735) |
|---|---|---|---|
| 1 | 2013 4/1 05:00 | syslogd | session opened for user root by root(uid=0) |
| ... | ... | ... | ... |

MONITORING INFORMATION MANAGEMENT TABLE 160

*Fig. 7*

| TENANT ID 810 | COMPONENT TYPE 811 | MONITORING SETTING FOR METRIC 812 | | AGENT DEPLOYMENT 816 | DISPLAY SETTING 817 |
| --- | --- | --- | --- | --- | --- |
| | | METRIC NAME 813 | MONITORING CYCLE 815 | | |
| 0 | VM | CPU USAGE | 30 SEC | REQUIRED | TO BE DISPLAYED |
| ... | ... | ... | ... | | |

MONITORING SPECIFICATION TABLE 150

*Fig. 8*

| SITE TYPE | ACCESS URL |
|---|---|
| SITE 0 | https://foobar.com/api/ |
| ... | ... |

MANAGED DOMAIN MANAGEMENT TABLE 154

*Fig. 9*

MANAGEMENT SERVER AND CONTROL METHOD OF THE MANAGEMENT SERVER FOR MANAGING A SERVICE SYSTEM VIRTUALLY BUILT USING CONNECTED COMPONENTS

CLAIM OF PRIORITY

The present application claims priority from Japanese patent application JP 2013-258798 filed on Dec. 16, 2013, the content of which is hereby incorporated by reference into this application.

BACKGROUND

This invention relates to a management server and a control method of the management server. In particular, this invention relates to a management server for managing service systems (tenants) created by virtualizing an information processing system managed by one or more management domains and a control method of the management server.

In recent years, application of cloud computing (cloud) to a data center (DC) has been promoted. A typical cloud is provided by a DC provider; virtualized multiple enterprise systems and multiple service systems within a company (referred to as tenants) are created in an information processing system composed of servers, storage apparatuses, and networks. Since the cloud is based on virtualization technology, it is superior to a physical system in extensibility. However, the cloud integrates a plurality of service systems in a single information processing system; co-existence of the multiple service systems (multi-tenancy) makes the cloud complex. In this disclosure, virtualized client-specific service systems or virtualized individual service systems integrated in a cloud are referred to as tenants.

Clouds provide various service styles, such as public cloud and private cloud. Some providers provide public cloud services. Private clouds are employed to build high-reliable and high-secure service systems, compared to public clouds.

Among the various cloud services, there are increasing instances where a client operating a private cloud additionally utilizes a public cloud to build their information processing system for themselves in light of scalability, agility, and cost. That is to say, clients build their service systems by not only using a single cloud but also combining multiple clouds.

Background art of this technical field includes the following documents to integratively monitor service systems built on multiple clouds for multiple tenants.

US 2012/0265863 A1 discloses a management system and a management method for efficiently managing and configuring virtual servers. The disclosed technique is that a management server having an interface for integratively managing a plurality of virtual server services (which correspond to a cloud in the embodiments of this application) periodically checks for a configuration change in the virtual server services being managed.

WO 2010/032701 A1 discloses a technique to easily determine a failure cause by collecting a plurality of kinds of performance information from a plurality of kinds of apparatuses being managed and extracting relations in time-series performance information.

SUMMARY

Many public clouds have a function called auto-scaling to secure scalability in performance. The auto-scaling is a function that the cloud automatically increases or decreases virtual resources. In such a cloud, when a trouble occurs in a service system, determination of the failure cause is difficult. This is because, since the configuration of the service system has already been changed, investigation of past events based on monitoring information on the service system will fail in matching the monitoring information with configuration information on the service system.

In operating and managing a service system on a combination of multiple clouds, the operation administrator of the system uses management systems different in individual clouds. Accordingly, regarding a service system built across multiple clouds, the administrator cannot know the connection topology of the clouds to overview the entire service system, which leads to difficulty in determining a failure cause.

US 2012/0265863 A1 discloses detecting a change in system configuration at the management server but does not disclose associating the change in system configuration with monitoring information. It does not take account of connections among a plurality of virtual server services.

WO 2010/032701 A1 discloses displaying a screen indicating a failure occurring period estimated based on the performance information collected from a plurality of kinds of monitoring target apparatuses and time-series variation in performance information; however, it does not assume an environment where the system configuration changes.

In view of the foregoing circumstances, an object of an aspect of this invention is to provide a management server for a service system built across a plurality of clouds and a control method for the management server that can indicate monitoring information associated with the configuration of the entire system and the change thereof.

To achieve the above object, a management server according to a representative embodiment of the present invention is a management server for managing a service system virtually built by using a plurality of components provided by data centers, the management server being connected with a management terminal and the data centers, and configured to: in building the service system, assign identifiers unique to the service system to components connected via a network among the plurality of components used to build the service system; record each of the identifiers associated with connection information indicating a connection with another component assigned one of the identifiers and a time of the building of the service system; upon detection of a change in the components included in the service system or a change in the connections of the components, record the identifier of the changed component associated with connection information indicating the changed connection and a time of the change of the connection; collect monitoring information indicating operation conditions of the components assigned the identifiers and monitoring times, which are times of creation of the monitoring information, from the one or more data centers; record the monitoring information associated with the monitoring times; upon receipt of information designating a time from the management terminal, identify and output connection information and monitoring information on the service system as of the designated time based on the identifiers of the components associated with the designated time.

In a management server managing a service system built across a plurality of clouds, an aspect of this invention enables indication of monitoring information associated with the configuration of the entire service system and the change thereof. As a result, the administrator can easily determine a failure cause.

BRIEF DESCRIPTION OF THE DRAWINGS

FIG. 4 illustrates a configuration example of a configuration information management table;

FIG. 5 illustrates a configuration example of a tenant initial connection table;

FIG. 6 illustrates a configuration example of a tenant management table;

FIG. 7 illustrates a configuration example of a monitoring information management table;

FIG. 8 illustrates a configuration example of a monitoring specification table;

FIG. 9 illustrates a configuration example of a managed domain management table;

DETAILED DESCRIPTION OF THE EMBODIMENTS

Hereinafter, embodiments are described with the drawings.

First Embodiment

Figure 2:
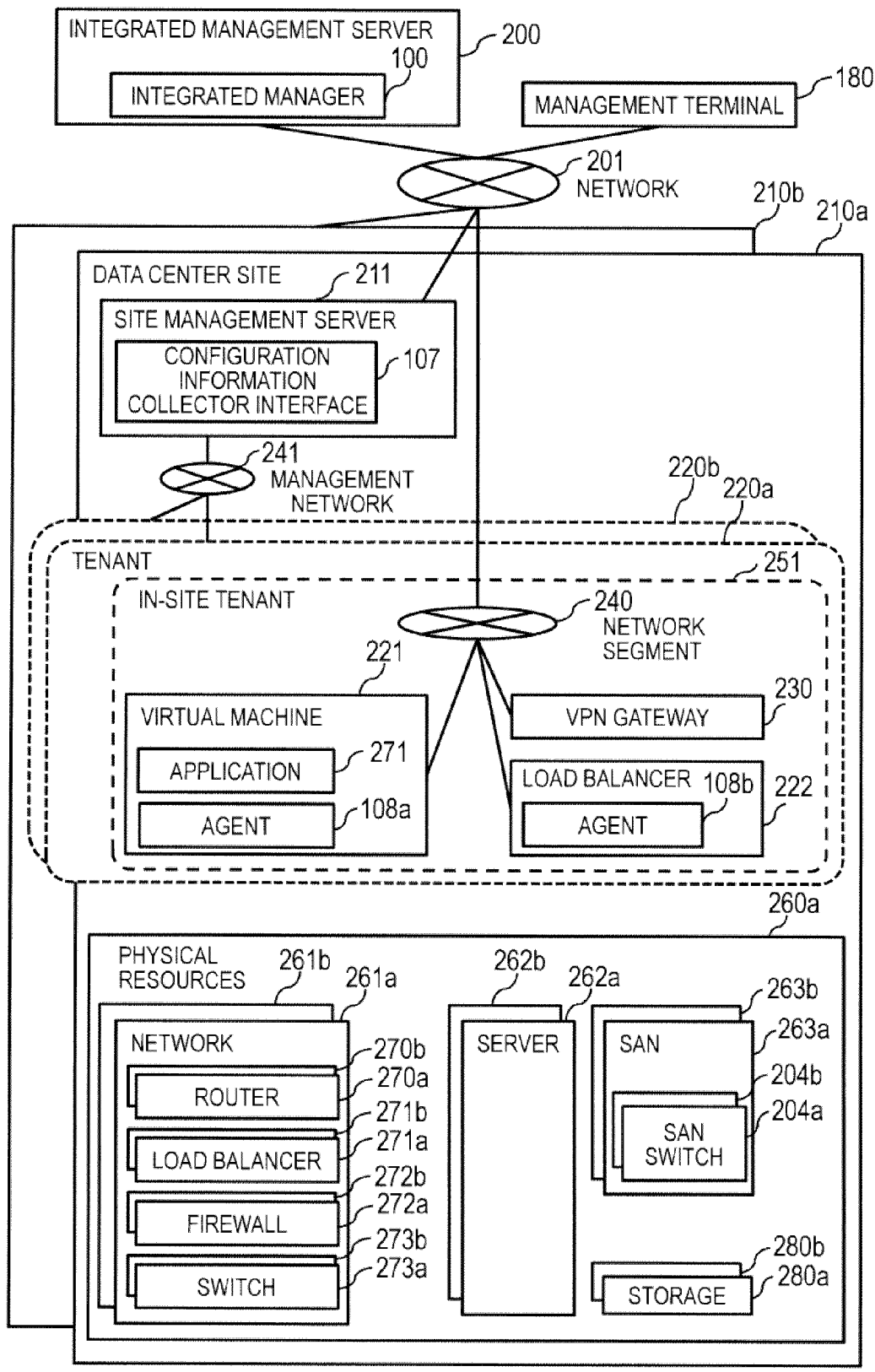
FIG. 2 illustrates a system configuration in the first embodiment of this invention.

FIG. 2 illustrates a system configuration in this embodiment.

A data center site 210 has physical resources 260 including networks 261, servers 262, storage networks 263, and storages 280 to provide services to clients. The data center site 210 selectively uses the physical resources 260 or uses a later-described virtualization technique to provide a site management server 211 and a management network 241. The site management server 211 includes a configuration information collection interface 107.

The configuration information collection interface 107 has a function of selectively or virtually providing the resources in the physical resources 260 to virtual machines 221, VPN gateway switches 230, and load balancers 222 to create in-site tenants 251, which are services provided by the data center site.

The configuration information collection interface 107 further has a function of changing and monitoring the conditions of the tenants via the management network 241 and managing the in-site tenants 220 configured in the data center site 210 with site tenant IDs, which are identifiers unique to the site.

Furthermore, the configuration information collection interface 107 has a function of managing the components that constitute individual tenants with site component IDs, which are identifiers unique to the site. The components of a tenant are hardware and software including a server, a storage, and a network the data center virtually provides, for example, a VPN gateway switch 230, a network segment 240, and a virtual machine 221. This configuration information collection interface 107 is implemented by a commonly available management console or API for a management interface.

A data center site 210 is connected with other data center sites 210 by a wide area network 201; a tenant 251 of a client can be built across a plurality of data center sites 210 managed by different site management servers 211.

An integrated management server 200 has a function of operating and managing the tenants 220 built across one or more data center sites 210 by connecting with the data sites 210 via the wide area network. An integrated manager 100 is used by receiving various requests from a management terminal 180 via the wide area network 201. The integrated manager 100 deploys tenants 220 and collects configuration information on the tenants 220 by communicating with the configuration information collection interfaces 107 in the site management servers 211 via the wide area network 201. Furthermore, the integrated manager 100 provides agents 108 to individual virtual machines 221, which are components of a tenant 220, and collects monitoring information on the virtual machines 221 from the agents 108 to acquire monitoring results. Each virtual machine 221 runs an application 271. The integrated manager 100 may be located in a data center site 210. It may be located in one of the site management servers 211. Details of the integrated manager 100 will be described later.

Figure 3:
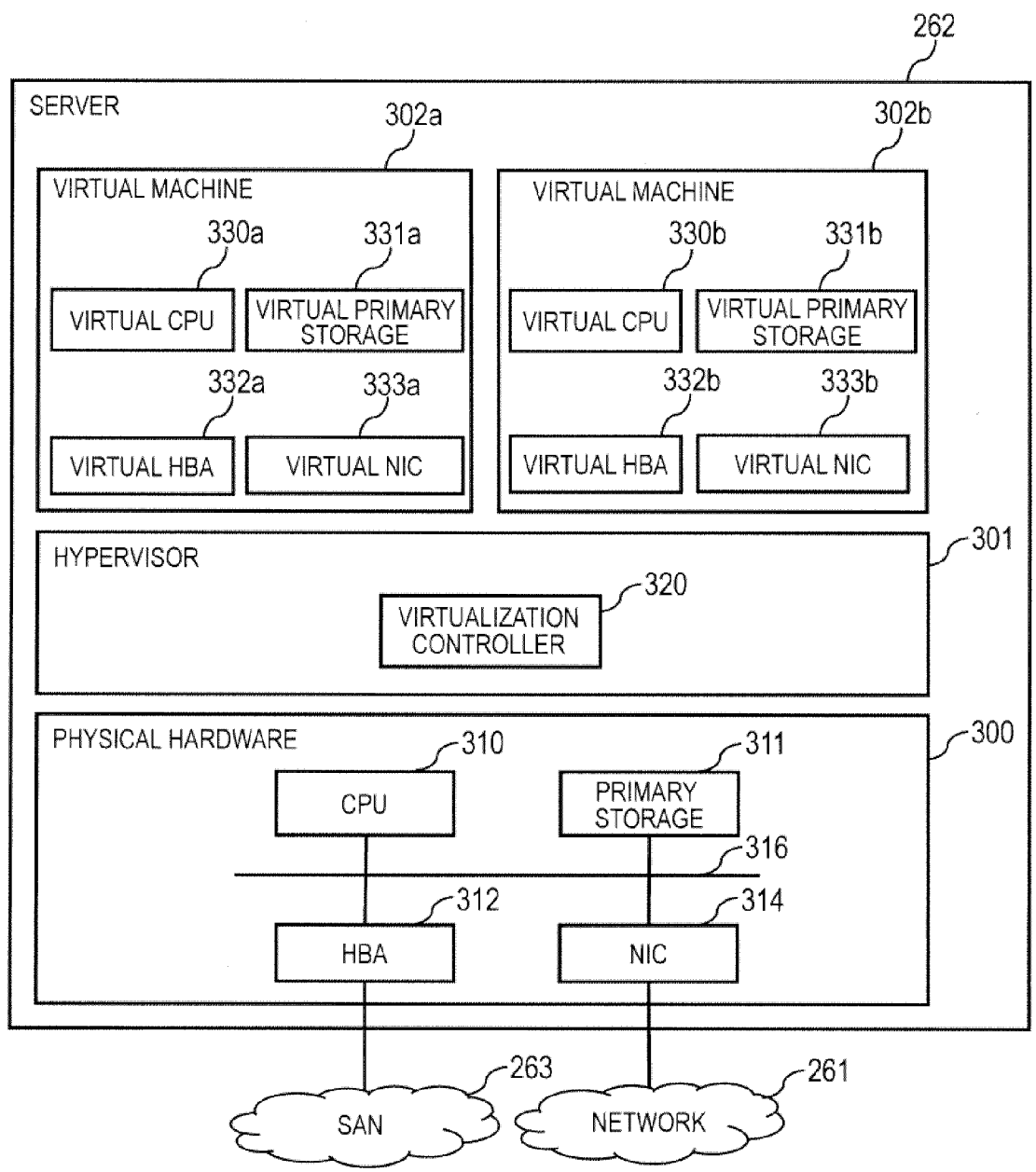
FIG. 3 illustrates an example of a server in the first embodiment of this invention.

FIG. 3 illustrates a configuration example of a server 262. The server 262 has physical hardware resources 300. The hardware resources 300 includes a CPU 310, a primary storage 311, a host bus adapter (HBA) 312, and a network interface card (NIC) 314, which are connected by a bus 316. The HBA 312 connects to the storage apparatuses 280 via the storage area networks (SANs) 263. The NIC 314 connects to the networks 261.

The server 262 is virtualized by a virtualization controller 320 of a hypervisor 301 to provide virtual machines 302. The virtualization controller 320 operates with the CPU 310 to control resource allocation to virtual CPUs 330, which are virtual CPUs of the virtual machines 302. Likewise, the virtualization controller 320 controls resource allocation of the primary storage 311, the HBA 312 and the NIC 314 to provide virtual primary storages 331, virtual HBAs 332, and virtual NICs 333.

Figure 1:
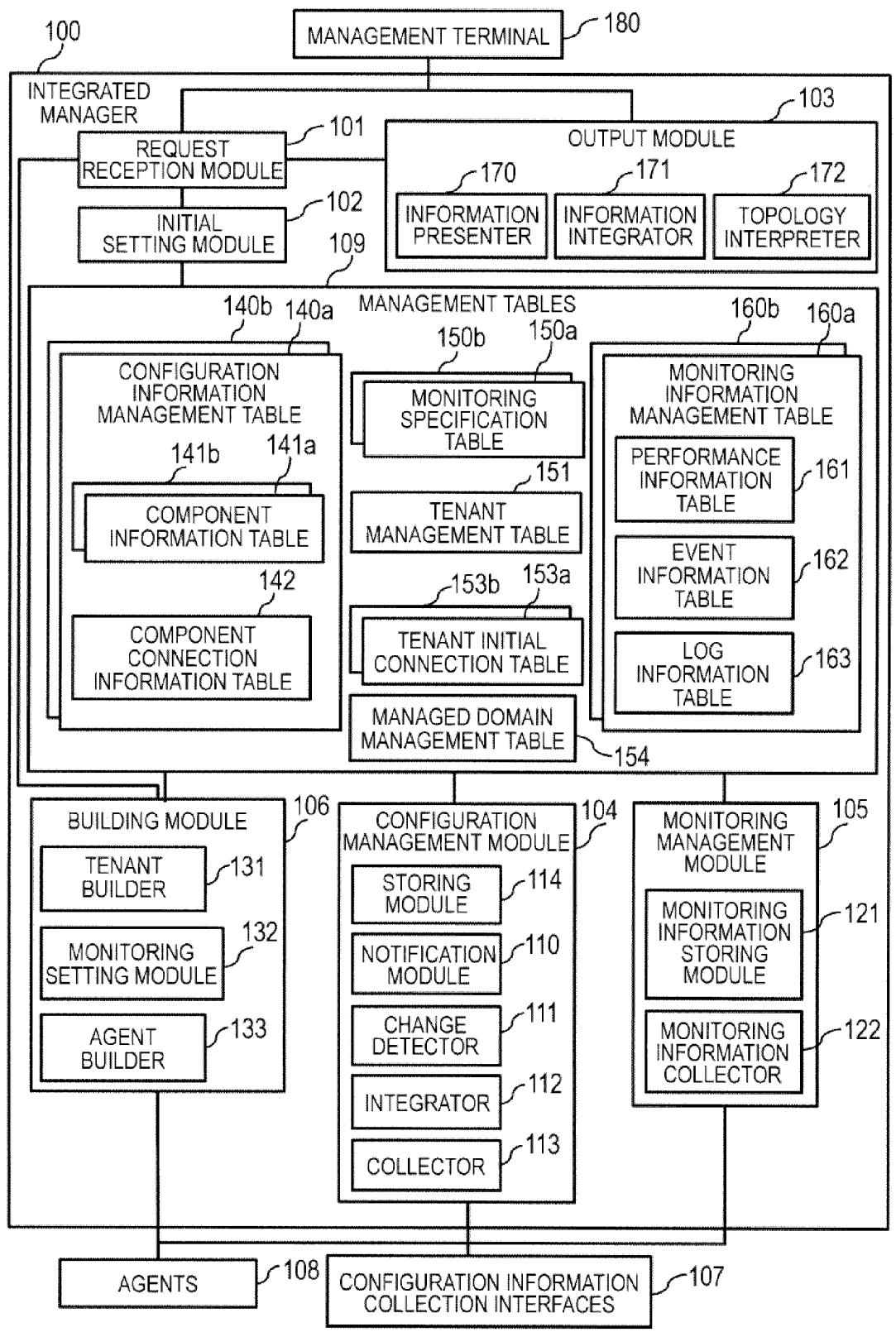
FIG. 1 illustrates a configuration example of an integrated manager in the first embodiment of this invention.

FIG. 1 illustrates an integrated manager 100 in this embodiment. The integrated manager 100 includes, for example, a request reception module 101, an initial setting module 102, a building module 106, a configuration management module 104, a monitoring management module 105, an output module 103, and management tables 109.

The request reception module 101 receives a monitoring request from the management terminal 180, interprets the request, and transfers the request to the initial setting module 102, the building module 106, or the output module 103. Examples of the monitoring request include a tenant building request, a monitoring result display request, and an initial setting request. The tenant building request is a request to deploy the components for a tenant, to perform initial settings for monitoring, and to start the monitoring. The monitoring result display request is a request to display a screen including configurations, performance information, event information, and log information on a tenant at one or more time points. This request includes designation of the one or more times and a tenant ID identifying the tenant. The initial setting request is a request to set initial values to the management tables 109. Examples of this request include a request to set design information for a tenant and specifications for monitoring the tenant prior to the tenant building request, a request designating monitoring metrics to be displayed prior to the monitoring result display request, and an initial system setting request to record access points to the configuration information collection interfaces 107 in the data center sites 210 managed by the integrated manager 100. Requests other than these examples may be defined as necessary.

The initial setting module 102 records values included in an initial setting request received at the request reception module 101 to the management table 109 designated by the request.

The building module 106 builds up a tenant and starts monitoring upon receipt of a tenant building request at the request reception module 101. The building module 106 includes, for example, a tenant builder 131 for deploying components for the tenant, a monitoring setting module 132 for integrating configuration information on the tenant deployed to a plurality of sites, and an agent builder 133 for deploying monitoring agents.

The configuration management module 104 detects a configuration change in a tenant and updates the management tables 109. The configuration management module 104 includes, for example, a collector 113 for collecting configuration information on tenants from the configuration information collection interfaces 107 for collecting management information on a data center site, an integrator 112 for integrating configuration information on two or more data center sites collected by the collector 113, and a change detector 111 for checking for any difference between the configuration information stored in the management tables 109 and the configuration information acquired by the collector 113, a notification module 110 for sending a request to change monitoring to the building module 106 upon detection of a configuration change, and a storing module 114 for storing acquired configuration information to the management tables 109.

The monitoring management module 105 receives monitoring data from one or more agents 108 and stores the data to monitoring information management tables 160. The monitoring management module 105 includes, for example, a monitoring information collector 122 for receiving monitoring data from the agents 108 and a monitoring information storing module 121 for storing the received monitoring data on a tenant-by-tenant basis.

The output module 103 organizes and presents configuration information, performance information, event information, and log information included in the management tables 109 in accordance with the conditions specified in a monitoring result display request received by the request reception module 101. The output module 103 includes, for example, an information integrator 171 for extracting configuration information and monitoring results satisfying the conditions specified in a monitoring result display request from the management tables 109 and a topology interpreter 172 for interpreting a topology from the extracted results, and an information presenter 170 for presenting those results to the management terminal 180.

The management tables 109 include, for example, a managed domain management table 154, a tenant management table 151, configuration information management tables 140, tenant initial connection tables 153, monitoring specification tables 150, and monitoring information management tables 160.

The managed domain management table 154 manages information to access the individual configuration information collection interfaces 107 in the data center sites 210 where tenants are deployed. Since this information defines data center sites that allow deployment of tenants, it is defined at initialization of the system through the initial setting module 102.

The tenant management table 151 manages components included in tenants, such as virtual machines 221 and VPN gateway switches 230. It further holds relations of in-site tenants 251 and identifiers assigned to the components.

The configuration information management tables 140 manage configuration information on individual components and information on connections of the components. The configuration information management tables 140 manage information on a tenant-by-tenant basis. Each configuration information management table 140 consists of, for example, component information tables 141 and a component connection information table 142. The component information tables 141 are separately defined for individual types of components because information to be managed is different depending on the type of component.

The tenant initial connection tables 153 are tables for managing connections of components; the information therein is received from the administrator as initial values prior to a tenant building request. The tenant initial connection tables 153 are created and managed on a tenant-by-tenant basis.

The monitoring specification tables 150 manage monitoring settings such as monitoring metrics for the components. The monitoring specification tables 150 are created on a tenant-by-tenant basis; the information therein is received from the administrator as initial values prior to a tenant building request.

The monitoring information management tables 160 store monitoring data acquired through the monitoring management modules 105. The monitoring information management tables 160 are created and managed on a tenant-by-tenant basis. Each monitoring information management table 160 consists of, for example, a performance information table 161, an event information table 162, and a log information table 163.

Although not shown in FIG. 1, the images of the components and the agents to be deployed are managed separately.

FIG. 4 illustrates a configuration example of a configuration information management table 140.

In (a-1) of FIG. 4, a configuration example of a component information table for virtual machines 400, which is one of the component information tables 141, is illustrated. Before deployment of a tenant, this table is used to manage initial design information on a tenant. After deployment of the tenant, it is used to store configuration information on the tenant in order of time series. This table is created before deployment of a tenant by the initial setting module 102, in response to a management request from a terminal. This table is created to originally include design information in the entries corresponding to the components to be created. The other fields are filled by the building module 106 at building a tenant.

For a more specific example, the component information table for virtual machines 400 includes a component ID column 410 for holding unique identifiers or component IDs, a time column 411 for holding times when the configuration information is created, and design information column 413 for managing design information. The design information column 413 includes sub-columns of, for example, a site type column 412 for indicating a data center site 210 to place the component and an IP address column 414 to record the IP address of the component. The design information column 413 is determined prior to a tenant building request; the tenant builder 106 deploys a tenant using the design information in the design information column 413. At the completion of deployment, the tenant builder 131 acquires new component IDs based on the site component IDs and records them to the component ID column 410 and further, fills the time column 411. For example, the first entry (415) of the component information table for virtual machines 400 indicates, before building a tenant, that a virtual machine having an IP address "192.168.100.100" is to be deployed in a data center site 210 identified with "SITE 0" and indicates, after building a tenant, that the virtual machine is identified with a component ID "0" and a time "2013/4/1 00:00". In (a-2) of FIG. 4, a configuration example of a component information table for network segments 401 is illustrated. In (a-3) of FIG. 4, a configuration example of a component information table for VPN gateways 402 is illustrated. These tables have the same configurations as the component information table for virtual machines 400; accordingly, description of these tables is omitted.

In (b) of FIG. 4, a configuration example of a component connection information table 142 is illustrated. This table manages connections between components managed by the component information table 141. Specifically, this table includes a component ID column 450 for uniquely managing connections included in this table and a time column 451 indicating the times when the connections are recognized. Furthermore, the table includes a connection origin component column 452 for holding connection origin components and a connection destination component column 455 for holding connection destination components. A connection origin component and a connection destination component are each managed with a component ID and a time of acquisition of the information on the component. Accordingly, the connection origin component column 453 and the connection destination component column 455 respectively have sub-columns of component ID columns 453, 456 and time columns 454, 457. For example, the first entry (458) of the component connection information table 142 indicates that the first entry (435) of the component information table for VPN gateways 402 is connected to the second entry (436) of the same table 402 by VPN connection.

FIG. 5 illustrates a configuration example of a tenant initial connection table 153. This table manages connections of components in a tenant received as initial values from the administrator at the request reception module before building the tenant. The information managed by this table includes information on VPN connections between data center sites, information on connections between a load balancer and the load balancers to partially take the load, information on connections between an application server and a data server, and other connection information. The tenant initial connection table 153 includes, for example, a type column 510 for indicating the types of connections, a connection origin IP address column 511, a connection destination IP address column 512, and a reference at detection of change column 513. For example, the second entry (515) of FIG. 5 indicates that the load balancer in the connection origin IP address column is connected to two components in the connection destination IP address column 512. The reference at detection of change column 513 indicates "x" if the information in the entry could be changed after building the tenant, and indicates "○" if it will not be changed.

FIG. 6 illustrates a configuration example of the tenant management table 151. The tenant management table 151 manages relations between tenant IDs, which are the identifiers assigned to tenants, and identifies assigned by individual data center sites 210 to the tenants and further, relations between identifiers assigned by the sites to the components of the individual tenants and component IDs uniquely managed by this system. The tenant management table 151 includes, for example, a tenant ID column 610, a site type column 611, a site-provided tenant ID column 612, a site-provided component ID column 613 for managing component IDs assigned by the sites, and a component ID column 614. The example of FIG. 6 indicates that the tenant having a tenant ID "0" is built across at least "SITE 0" and "SITE 1", that the identifiers of the tenant in these sites are both the same value "1", that the tenant includes or has ever included a component identified with an identifier "i-123456" in "SITE 0", and that the component is managed under an identifier "1" by the integrated manager 100.

FIG. 7 illustrates a configuration example of a monitoring information management table 160. A configuration example of a performance information table 161 for storing performance information is illustrated in (a) of FIG. 7. This table includes, for example, a component ID column 711 for identifying monitoring targets, a time column 712 for indicating acquisition times, a metric name column 714 for indicating metric types to be monitored, and a metric value column 715 for storing acquired data. A configuration example of an event information table 162 is illustrated in (b) of FIG. 7 and a configuration example of a log information table 163 is illustrated in (c) of FIG. 7. The event information table 162 includes a component ID column 721, a time column 722, and an event column 723. The log information table 163 includes a component ID column 731, a time column 732, a log type column 734, and a log column 735.

FIG. 8 illustrates a configuration example of a monitoring specification table 150. The monitoring specification table 150 manages monitoring settings such as metrics to be monitored in the components. The monitoring specification table 150 includes, for example, a component type column 811 for indicating types of component to be monitored, a metric name column 813, a monitoring cycle column 815 for specifying cycles to collect monitoring data, an agent deployment column 816 for indicating whether to place a monitoring agent in the component, and a display setting column 817 for indicating whether to include the information in a monitoring result displayed by the output module 103 on the management terminal 180. The values in the display setting column 817 are set by the administrator as necessary through the request reception module 101 prior to issuance of a monitoring result display request to the request reception module 101.

FIG. 9 illustrates a configuration example of the managed domain management table 154. The managed domain management table 154 manages information on configuration information collection interfaces in individual data center sites 210 where to deploy tenants. The managed domain management table 154 includes, for example, a site type column 910 for identifying data center sites and an access URL column 911 for indicating end points of the configuration information collection interfaces 107 of the sites.

Hereinafter, processing flows of the integrated manager 100 are described. The processing of the integrated manager 100 includes four flows of processing: new tenant building processing and integrated displaying processing, which are responsive to a request from the administrator, configuration information collecting processing performed by the configuration management module 104, and monitoring processing performed by the monitoring information collector 122.

Figure 10:
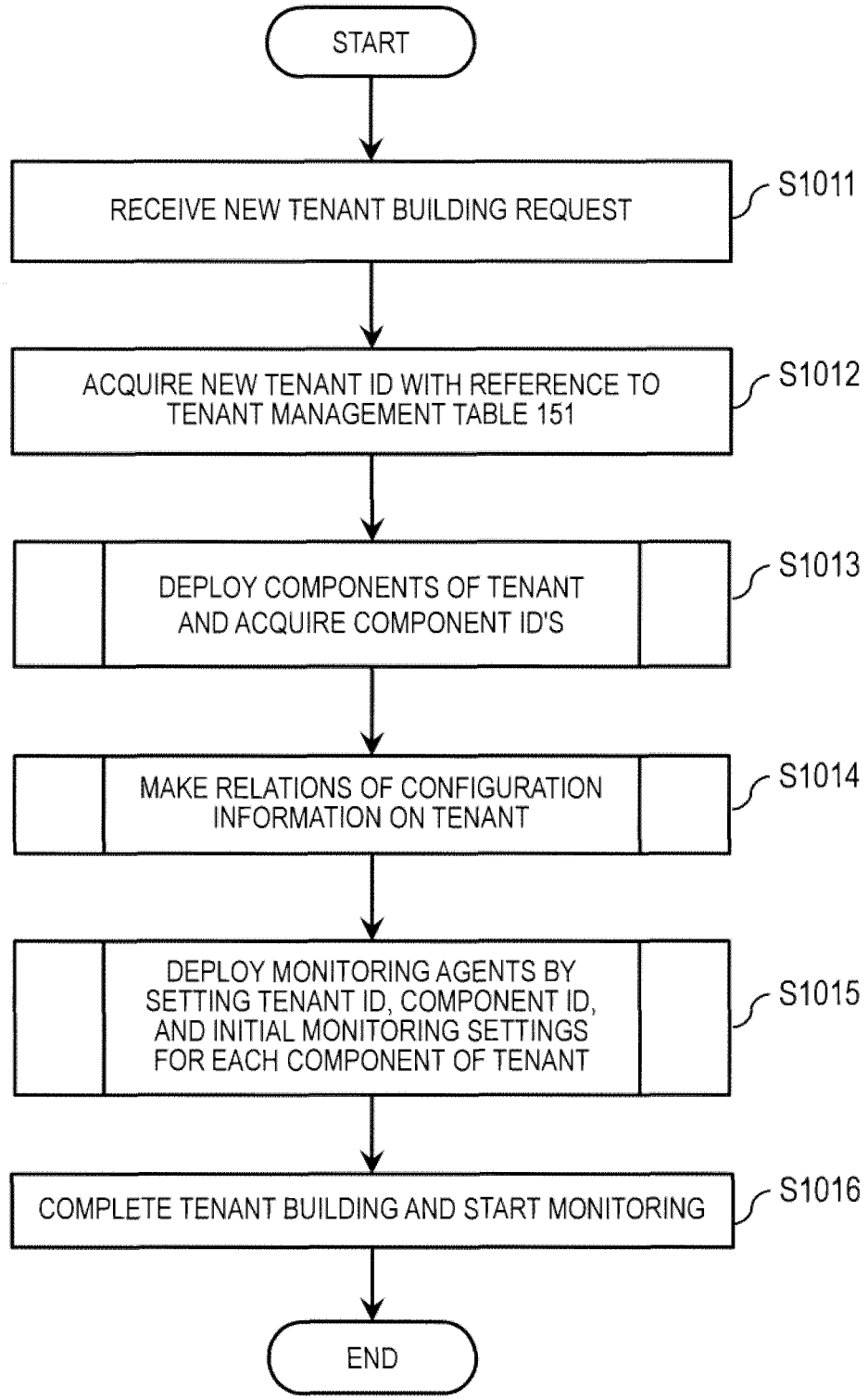
FIG. 10 is a flowchart illustrating processing in response to a request to build a new tenant.

FIG. 10 is a flowchart illustrating the new tenant building processing. This processing deploys a tenant using design information and monitoring setting information for the tenant provided in advance by the administrator through the request reception module 101 and starts monitoring. First, the request reception module 101 receives a new tenant building request from the management terminal 180 (S1011). Next, the tenant builder 131 acquires a new tenant ID with reference to the tenant management table 151 (S1012). The new tenant ID can be acquired by searching the tenant ID column of the tenant management table and assigning an unused number to the new tenant. Next, the tenant builder 131 deploys the components specified in a predefined component information table 141 and acquires component IDs for the deployed components (S1013). The component IDs can be acquired by the same method of acquiring the tenant ID.

Next, the monitoring setting module 132 makes relations of configuration information on the tenant using the component information table 141 and the tenant initial connection table 153 for the deployed tenant (S1014). That is to say, the monitoring setting module 132 defines connections of components included in the tenant. Next, the agent builder 133 deploys monitoring agents by setting the tenant IDs, the component IDs, and the metrics with reference to the monitoring specification table 150 and the tenant management table 151 (S1015). Through the foregoing processing, a tenant is built and monitoring is started by running the monitoring agents on the monitoring target components (S1016).

Next, Steps S1013, S1014, and S1015 are described in detail.

Figure 24:
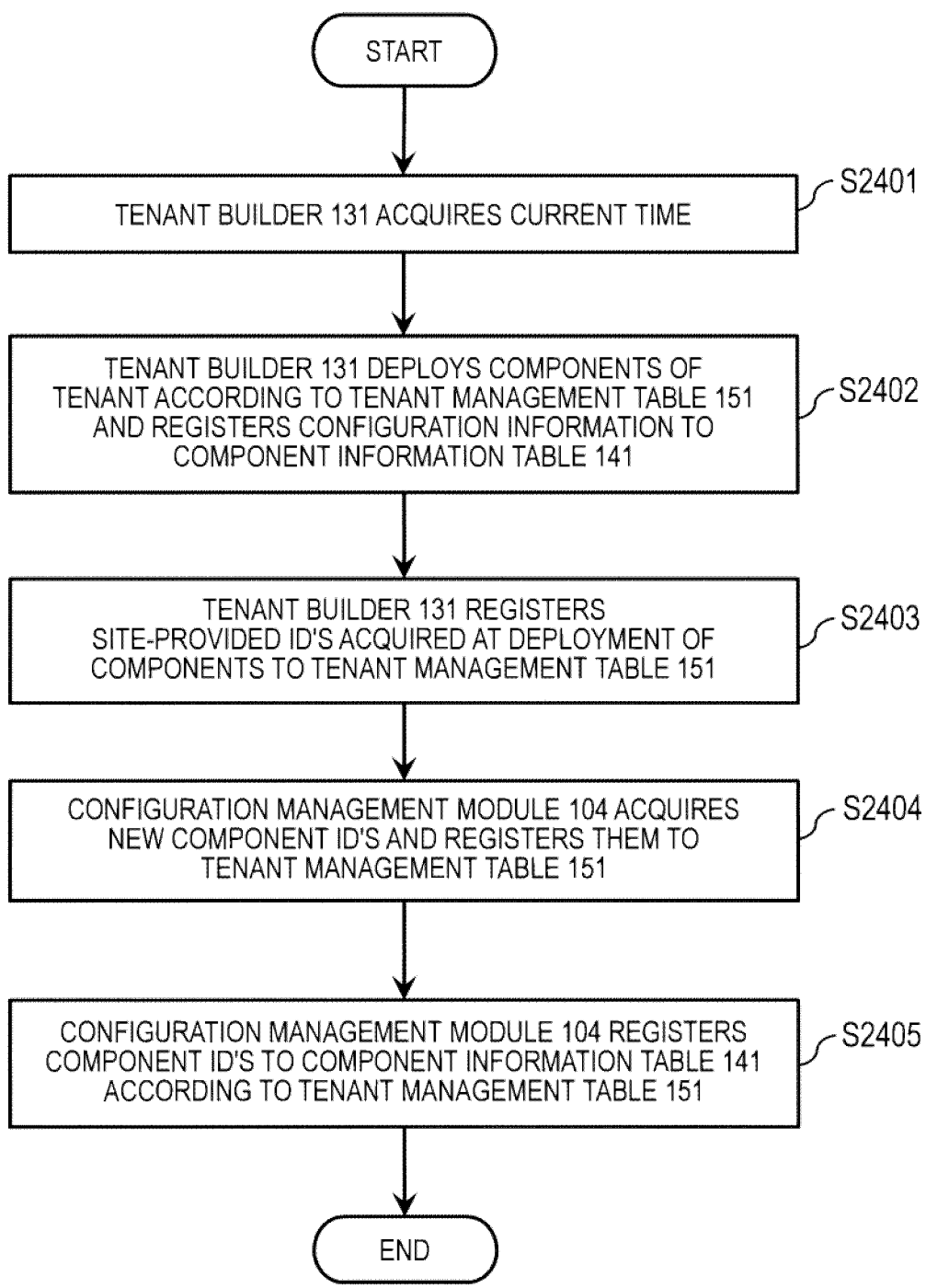
FIG. 24 is a flowchart of processing of a monitoring management module in the second embodiment of this invention.

FIG. 24 is a flowchart illustrating the details of Step S1013. This processing is executed by the tenant builder 131. First, the tenant builder 131 acquires the current time (S2401). Next, the tenant builder 131 deploys the components of the tenant in accordance with the information in the tenant management table 151 and registers configuration information to the component information table 141 (S2402). The components can be deployed by the method according to JP 2012-253550 A, for example. Next, the tenant builder 131 registers the site-provided IDs acquired in deploying the components to the tenant management table 151 (S2403). Next, the configuration management module 104 newly acquires component IDs and registers them to the tenant management table 151 (S2404). The configuration management module 104 also registers the component IDs to the component information table 141 in accordance with the information in the tenant management table 151 (S2405). Through this processing, a new tenant is deployed and the tenant can be managed by the integrated manager 100 with component IDs unique thereto.

Figure 14:
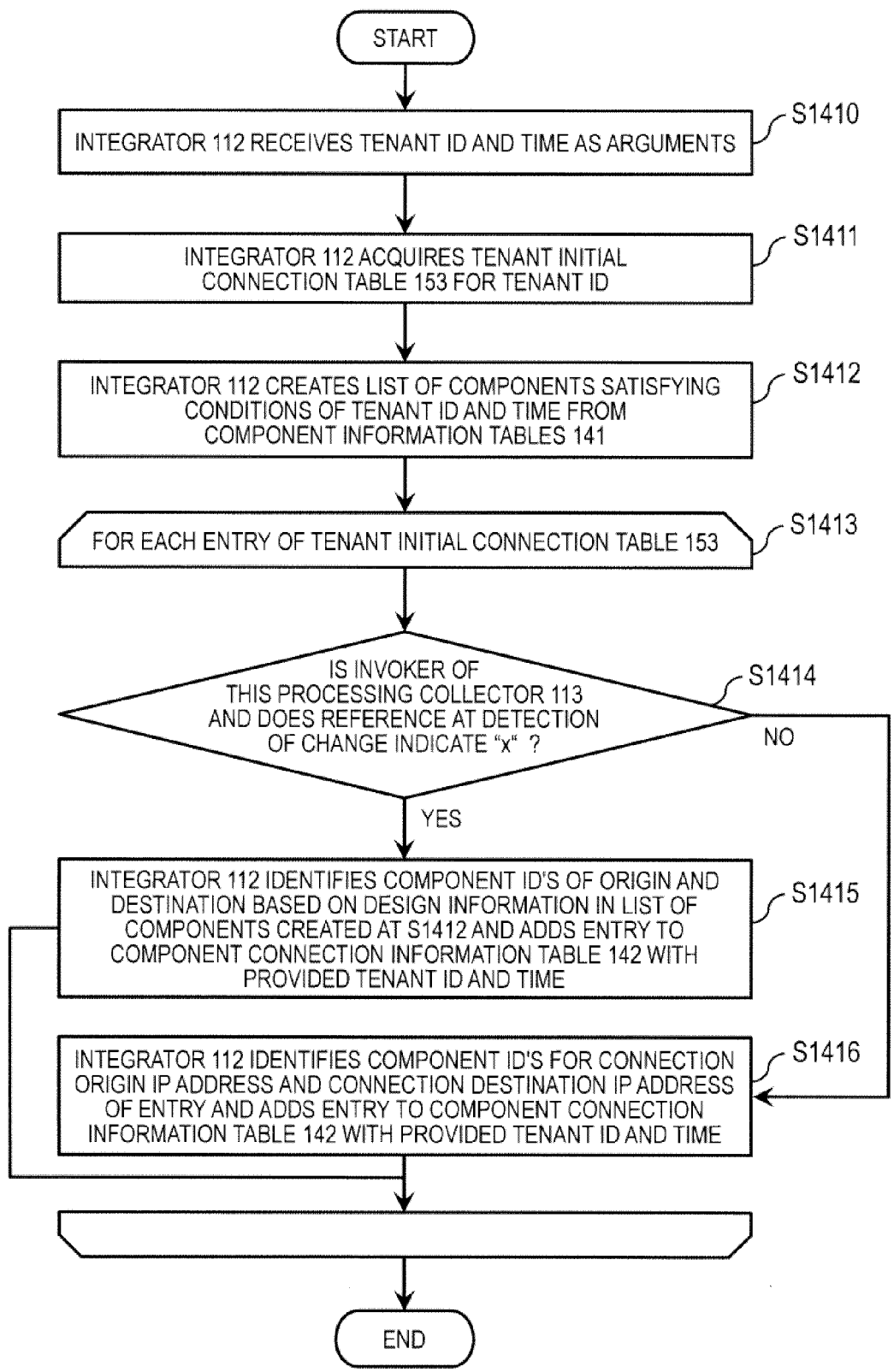
FIG. 14 is a flowchart of processing of an integrator.

FIG. 14 is a flowchart illustrating the details of Step S1014. This processing is executed by the integrator 112. This processing is also invoked by the collector 113 in the later-described configuration information collecting processing in FIG. 11 other than in the new tenant building processing.

First, the integrator 112 receives the tenant ID and the time as arguments (S1410). Next, the integrator 112 acquires the tenant initial connection table 153 for the new tenant identified with the tenant ID (S1411). At step S1412, the integrator 112 extracts information on the components identified with the tenant ID and the time from the information stored in the component information table 141 (S1412).

Next, the integrator 112 performs processing from Step S1414 to Step S1416 on each entry of the tenant initial connection table 153 (Step S1413). First, the integrator 112 checks whether this processing has been invoked by the collector 113 and the value of the reference at detection of change column 513 in the entry being processed is "x" (S1414). If the invoker of this processing is the collector 113, it means that a configuration change in the tenant might have been detected. Also, the value "x" of the reference at detection of change column 513 means the information in the entry is changed after the tenant is built. Accordingly, if the conditions in Step S1414 are satisfied, the connection indicated by the entry of the tenant initial connection table 153 might have been changed.

If the conditions in Step S1414 are satisfied, the integrator 112 proceeds to Step S1415. In this case, since the connection between the components indicated by the entry of the tenant initial connection table 153 might have been changed, the integrator 112 needs to update the component connection information table 142 using the latest component information table 141 to which configuration change of the tenant has been reflected. Accordingly, the integrator 112 newly creates the component connection information table 142 with the information on the components acquired and extracted at Step S1412 by the collector 113. For this purpose, the integrator 112 acquires IP addresses of the connection origin and connection destination recorded in the connection information on the connection type of the entry being processed in the tenant initial connection table 153 and searches the component information table 141 with these IP addresses. As a result of the search, if an entry identified by either one of the IP addresses exists, the integrator 112 adds a new entry including the component ID of the entry to the component connection information table 142. For example, if the VPN connection in the tenant initial connection table 153 in FIG. 5 is the connection type of the entry being processed, the integrator 112 searches the component information table 141 in FIG. 4 with the connection origin IP address "10.0.0.16" and the connection destination IP address "192.168.100.205". Since the component IDs of the entry identified with these IP addresses are "20" and "21", the integrator 112 adds connection information indicating that components "20" and "21" are connected to the component connection information table 142 under a component ID "100".

If the conditions in Step S1414 are not satisfied, the integrator 112 proceeds to Step S1416. It should be noted that if this processing is invoked in the processing responsive to receipt of a new tenant building request, the invoker is the building module 106; accordingly, the determination at Step S1414 should be that the conditions are not satisfied. Since the connection information does not change with time, the integrator 112 creates an entry of the component connection information table 142 using the information in the entry being processed in the tenant initial connection table 153. Accordingly, at Step S1416, the integrator 112 identifies component IDs by searching the component information table 141 with the IP addresses of the connection origin and connection destination in the entry being processed in the tenant initial connection table 153 and adds a new entry to the component connection information table 142 based on the information.

Through this processing, the integrator can interpret the connections of components including the relation of the in-site tenants acquired from a plurality of data center sites 210.

Figure 15:
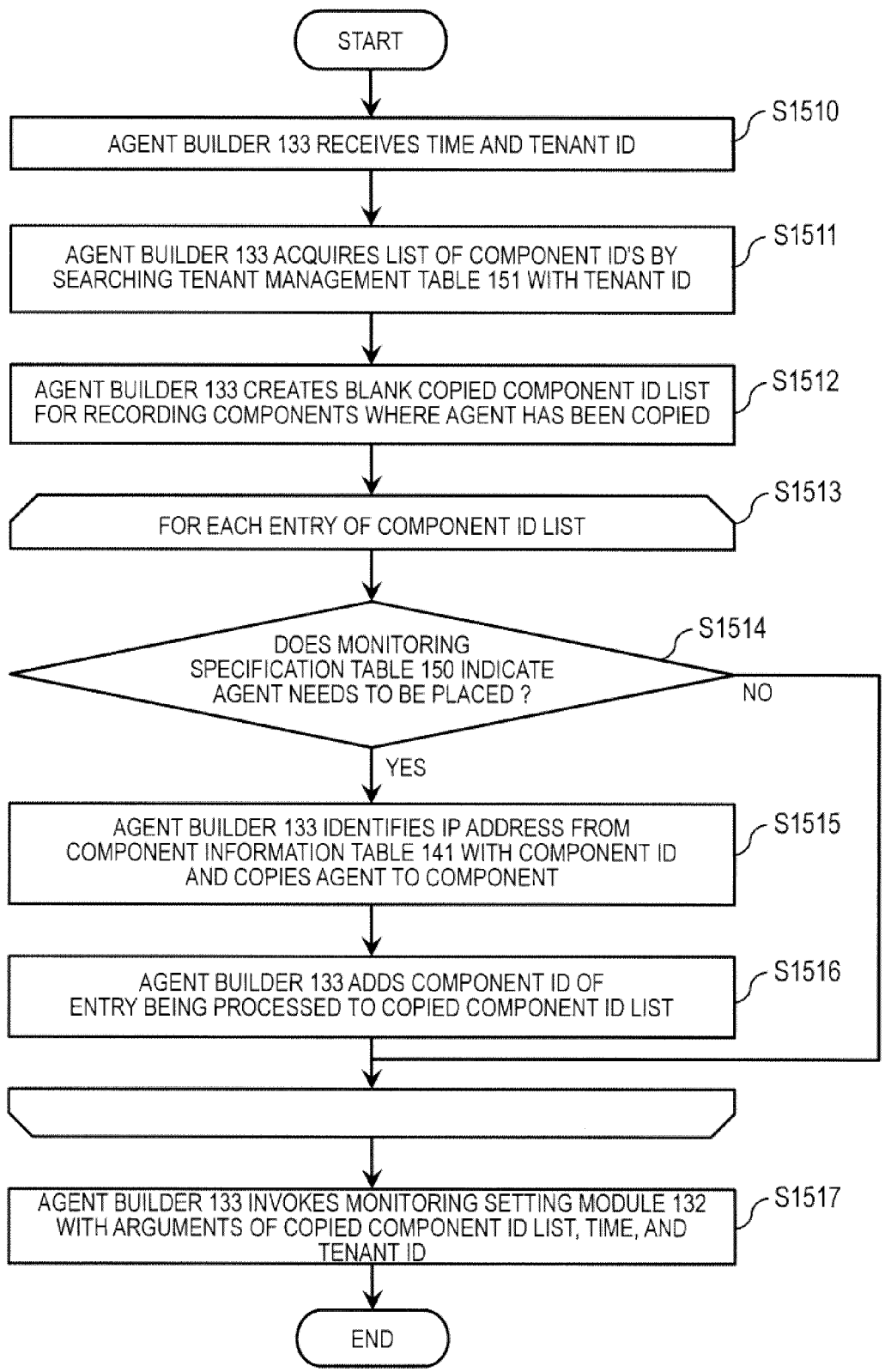
FIG. 15 is a flowchart of processing of an agent builder.

FIG. 15 is a flowchart illustrating the details of Step S1015. This processing is executed by the agent builder 133. First, the agent builder 133 receives a time and a tenant ID of the tenant where to deploy monitoring agents (S1510) and acquires a list of component IDs of the components included in the tenant by searching the tenant management table 151 with the tenant ID (S1511). Next at Step S1512, the agent builder 133 creates a blank component ID list for storing the result of agent deployment. Next, the agent builder 133 executes the processing from Step S1514 to Step S1516 to each of the component IDs acquired at Step S1511 in order to deploy monitoring agents and provide initial settings (Step S1513). First, at Step S1514, the agent builder 133 checks whether an agent needs to be placed with reference to the monitoring specification table 150. If an agent needs to be placed, the agent builder 133 identifies the IP address of the component with the component ID, deploys a monitoring agent at the IP address by remote copy (Step S1515), and adds the component list ID to the copied component ID list (Step S1516). Subsequently, the agent builder 133 invokes monitoring setting processing with arguments of the copied component ID list, the time, and the tenant ID (Step S1517).

Figure 16:
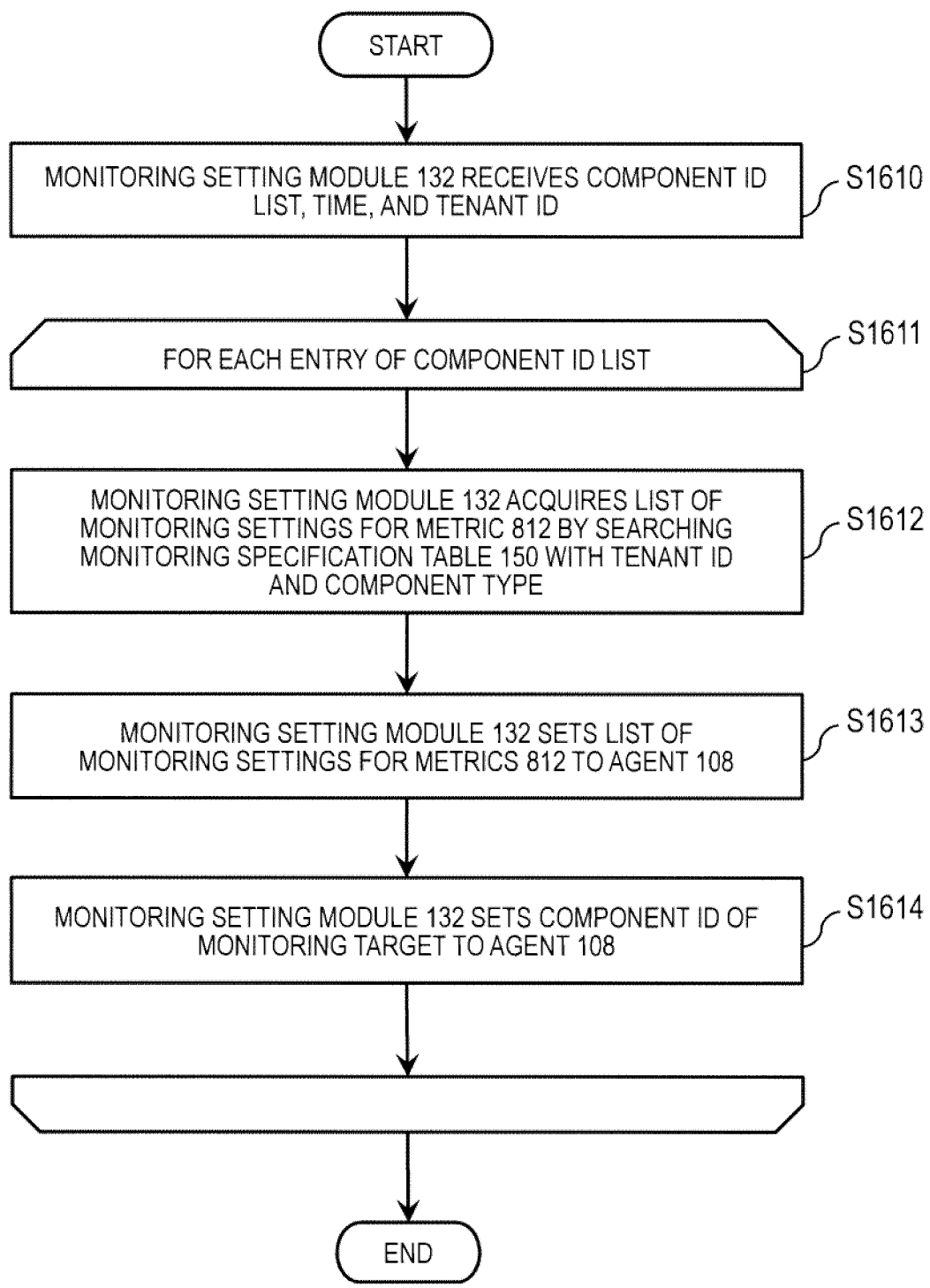
FIG. 16 is a flowchart of processing of a monitoring setting module.

FIG. 16 is a flowchart of the processing of the monitoring setting module 132 invoked at Step S1517. This processing provides initial settings for the operation of the agents. First at Step S1610, the monitoring setting module 132 receives the component ID list, the time, and the tenant ID. Next, the monitoring setting module 132 executes the processing from Step S1612 to Step S1614 on each entry of the component ID list to provide initial settings to each agent (S1611). At Step S1612, the monitoring setting module 132 searches the monitoring specification table 150 based on the component type of the component being processed to obtain all the metric names 813 and monitoring cycles 815 for the component being processed, and sets them for the operation of the monitoring agent at Step S1613. Next, at Step S1614, the monitoring setting module 132 sets the component ID of the monitoring target component to the agent 108.

As a result of this processing, the agents 108 can obtain monitoring results on the designated metrics with the designated monitoring cycles and send the results together with the time and the component IDs.

Figure 11:
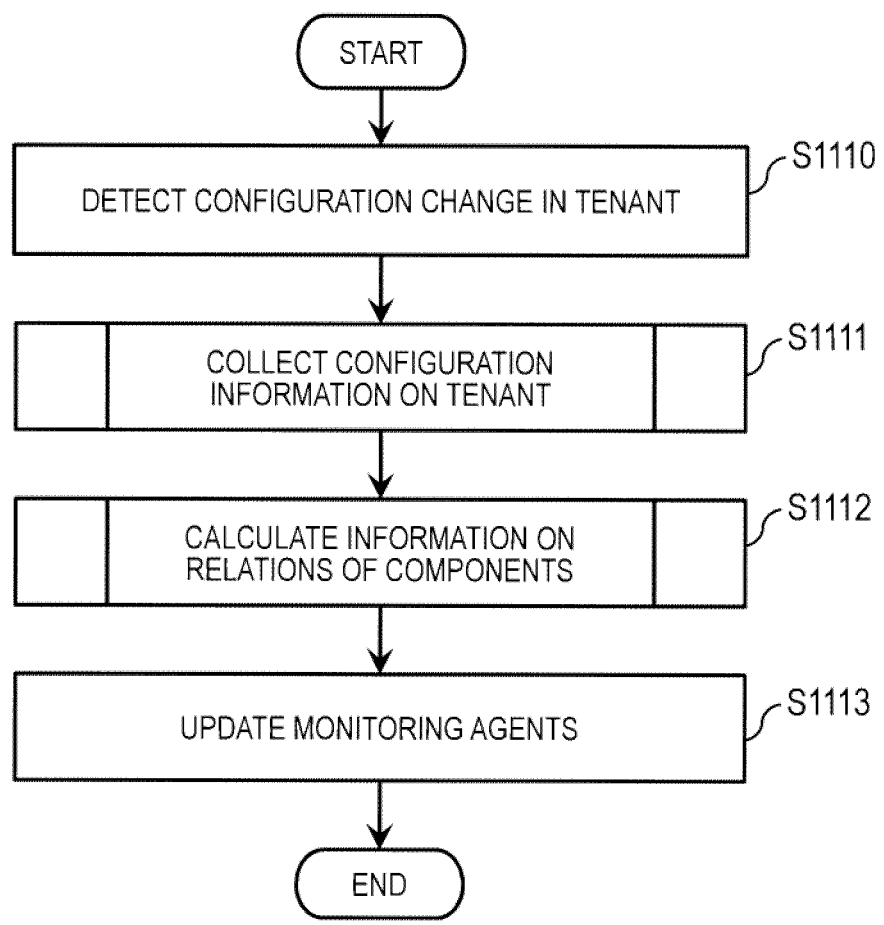
FIG. 11 is a flowchart illustrating configuration management processing in response to a configuration change of a tenant.

FIG. 11 is a flowchart illustrating the configuration information collecting processing. This processing collects new configuration information upon detection of a configuration change in a tenant and creates a monitoring environment under the new configuration. First, the collector 113 accesses the configuration information collection interfaces 107 to detect a configuration change in a tenant (S1110). In an example, the configuration information collection interface 107 is configured to notify the collector 113 of a configuration change made by an auto-scale function as an event. The collector 113 detects a configuration change by receiving the event. Next, the collector 113 collects the configuration information on the tenant (S1111).

Next, at Step S1112, the integrator 112 interprets the connections of the components using the component information tables 141 including information collected from individual sites at Step S1111 and the tenant initial connection table 153 and registers them to the component connection information table 142. The processing of this step is the same as Step S1014; accordingly, description of the details is omitted.

Next, at Step S1113, the change detector 111 compares the tenant information collected at Step S1111 with the latest tenant information stored in the configuration information management table 140, identifies the increased component, and notifies the agent builder 133 of the information with the notification module 110. Furthermore, the agent builder 133 configures monitoring on the increased component and adds the component to the monitoring targets.

Figure 13:
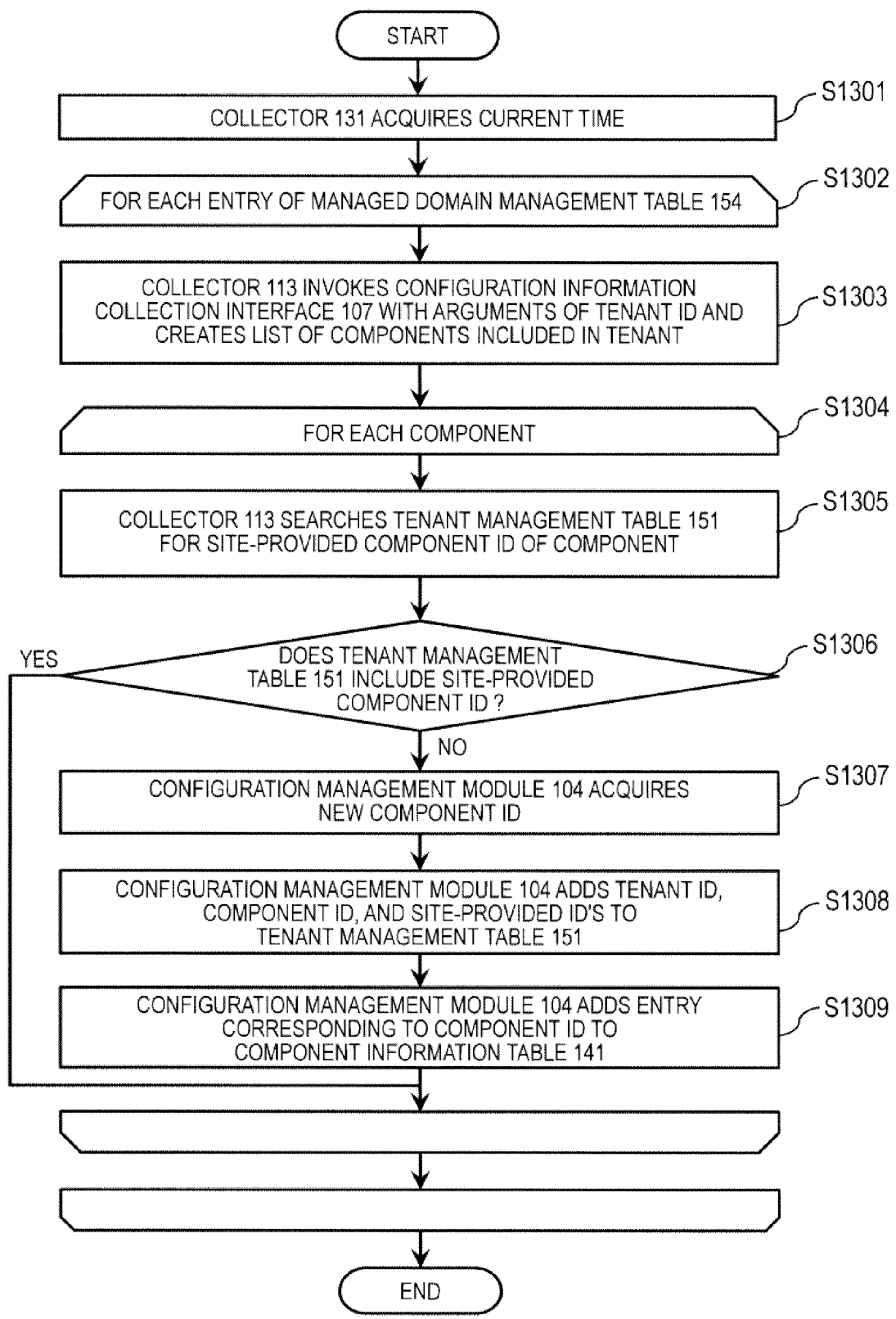
FIG. 13 is a flowchart of processing of a collector.

FIG. 13 is a flowchart illustrating the details of Step S1111. This processing is executed by the collector 113. First, the collector 113 acquires the current time (S1301). Next, the collector 113 executes the processing from Step S1303 to S1309 on each entry of the managed domain management table 154 (S1302). At Step S1303, the collector 113 invokes a configuration information collection interface 107 with an argument of a tenant ID and creates a list of components included in the tenant. Next, the collector 113 executes the processing from Step S1305 to S1309 on each component of the acquired component list (S1304). At Step S1305, the collector 113 checks whether the tenant management table 151 includes the site-provided component ID of the component (S1305). If the site-provided component ID is included (S1306: YES), the collector 113 proceeds to Step S1304. If the site-provided component ID is not included (S1306: NO), the collector 113 executes Steps S1307 to S1309. At Step S1307, the collector 113 acquires a new component ID with the configuration management module 104. At Step S1308, the collector 113 adds a new entry to the row for the tenant ID and the site type in the tenant management table 151 and records the component ID acquired at Step S1307 and the site-provided IDs acquired at Step S1303. At Step S1309, the collector 113 acquires the component information table 141 for the type of the component being processed and creates and adds an entry including the component ID assigned at Step S1307 and the information on the component being processed acquired at Step S1303.

Through this processing, a tenant ID is associated with the components included in the tenant in the tenant management table 151, the site-provided identifiers are associated with the identifiers for the integrated manager in the tenant management table 151, and the state of a component is associated with a time in the configuration information management table 140.

Figure 19:
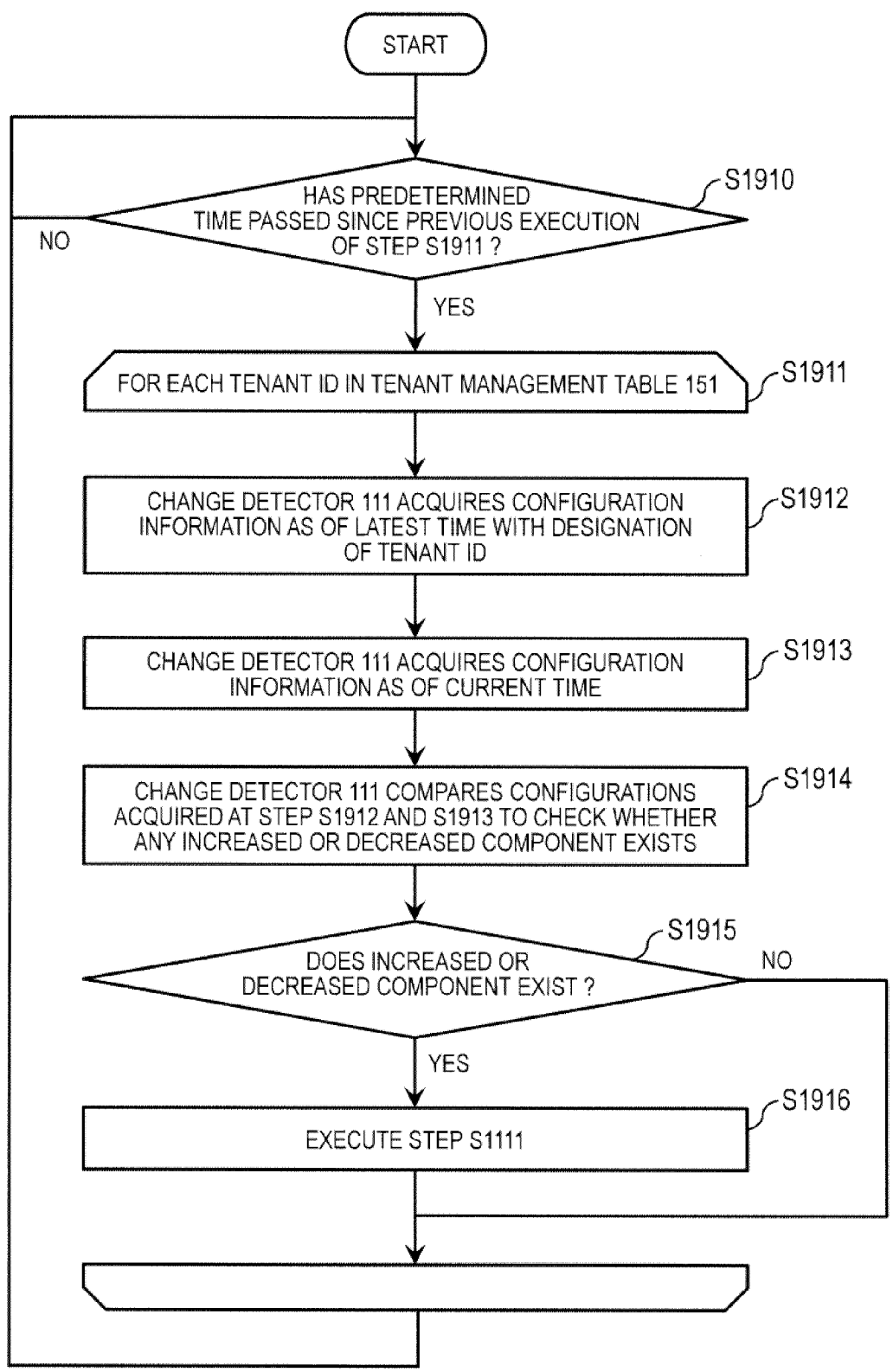
FIG. 19 is a flowchart of processing of a change detector.

FIG. 19 is a flowchart illustrating a modified example of Step S1110. The change detector 111 is periodically invoked on a tenant-by-tenant basis (S1910) and executes the processing from Step S1912 to Step S1916 (S1911). The change detector 111 extracts configuration information as of the latest time from the configuration information management table 140 at Step S1912, and acquires a list of configuration information as of the current time with the collector 113 at Step S1913. Next, the change detector 111 compares the configuration information acquired at Steps S1912 and S1913 to check whether any increased or decreased component exists (S1914). If information on some component or component connection has been changed, the change detector 111 determines that there exists a change (Step S1915). If the determination at Step S1915 is that there exists a change, the change detector 111 proceeds to Step S1916 and invokes the processing of the collector 113 illustrated in FIG. 13.

Figure 17:
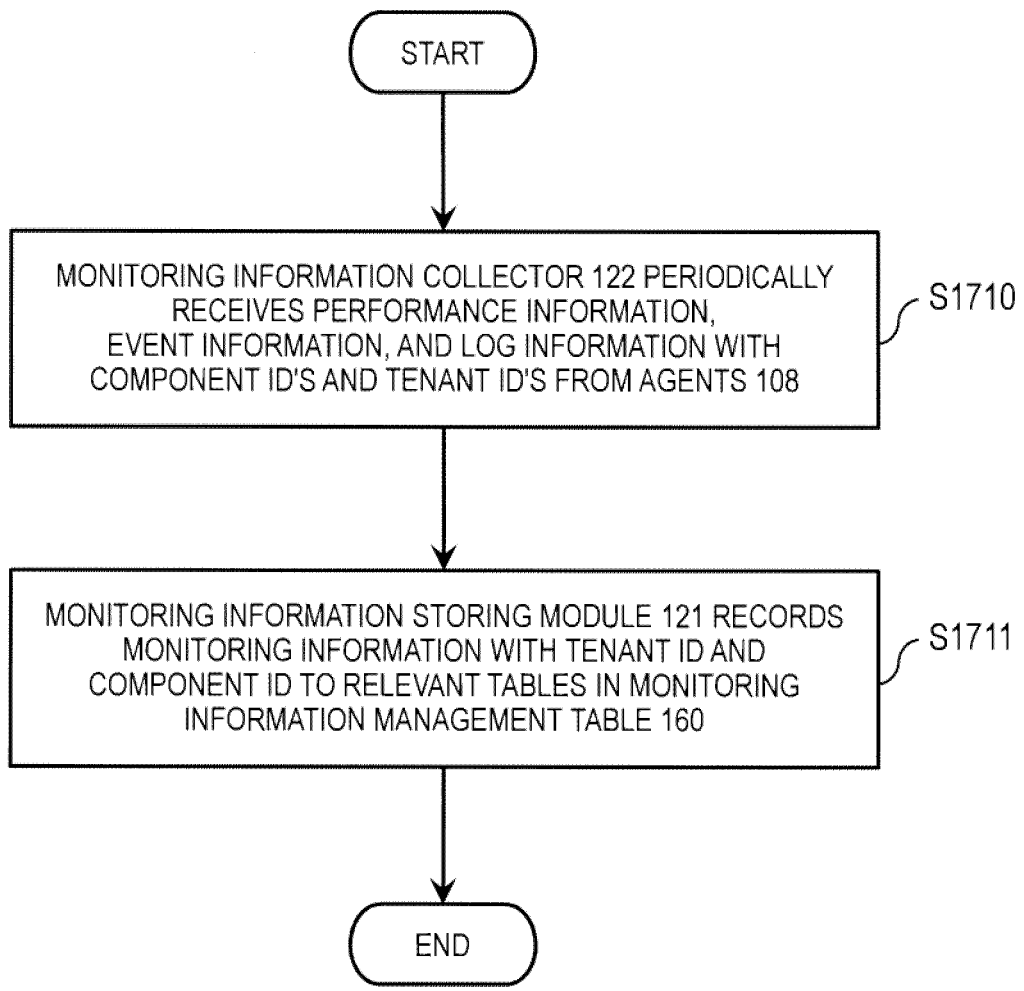
FIG. 17 is a flowchart of processing of a monitoring information collector.

FIG. 17 is a flowchart illustrating the monitoring processing of the monitoring information collector 122. This processing collects monitoring information through the agents 108, associates the monitoring information with a tenant, a component, and a time, and stores the result.

The monitoring information collector 122 periodically receives a monitoring result from each agent 108 together with information of a time and a component ID (S1710). Next, the monitoring information storing module 121 invoked by the monitoring information collector 122 identifies a tenant ID by searching the tenant management table 151 with the component ID included in the data received by the monitoring information collector 122, acquires the monitoring information management table 160 for the tenant ID, and adds the monitoring result to the relevant table selected from the performance information table 161, the event information table 162, and the log information table 163 in accordance with the type of the received monitoring result (S1711). Through this processing, collected data can be managed in the monitoring information management table 160 by tenant ID, component ID, and time.

Figure 12:
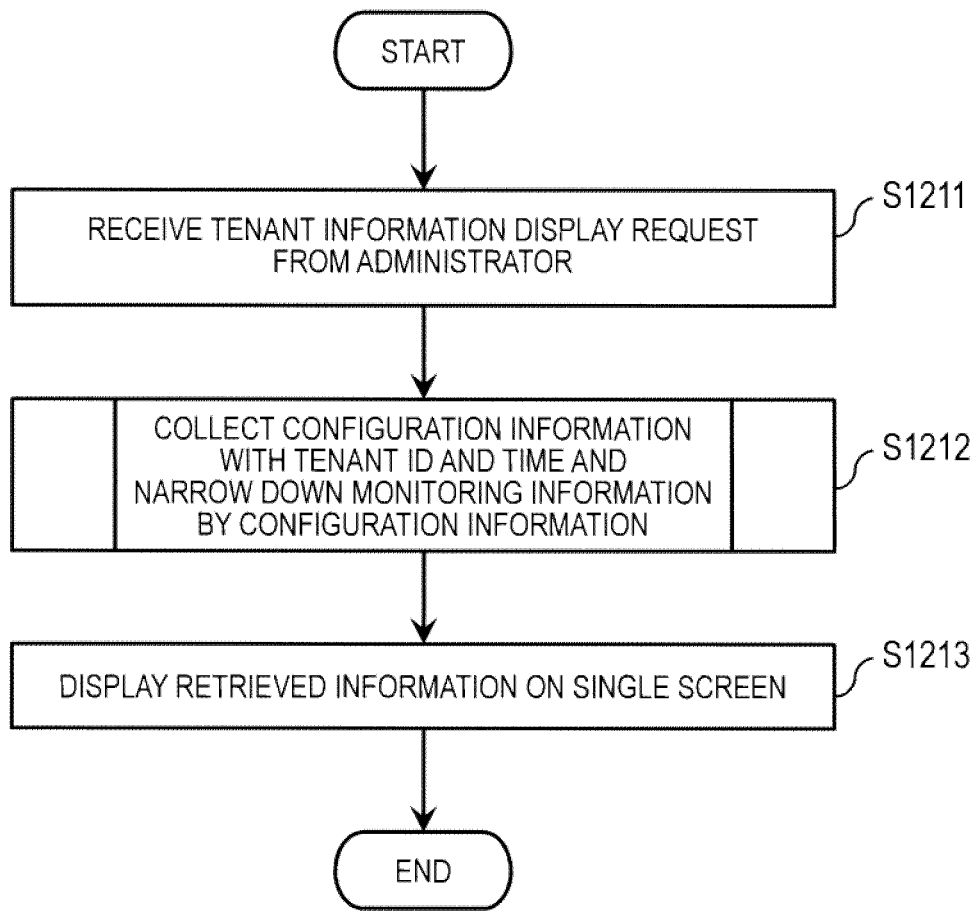
FIG. 12 is a flowchart illustrating processing in response to an integrated display request.

FIG. 12 is a flowchart illustrating the processing upon receipt of a display request. This processing organizes and displays a plurality of collected monitoring results on a screen in response to a request of the administrator. First, the request reception module 101 receives a monitoring result display request from the management terminal 180 (S1211). Next, the information integrator 171 retrieves configuration information of the tenant ID at the time designated by the display request from the configuration information management table 140 and further retrieves relevant information from the monitoring information management table 160 based on the component IDs in the retrieved configuration information and the designated time (S1212). Next, the information presenter 170 requests the topology interpreter 172 to interpret the configuration information retrieved at Step S1212 and displays the result and the other monitoring data on a single screen (S1213).

Figure 18:
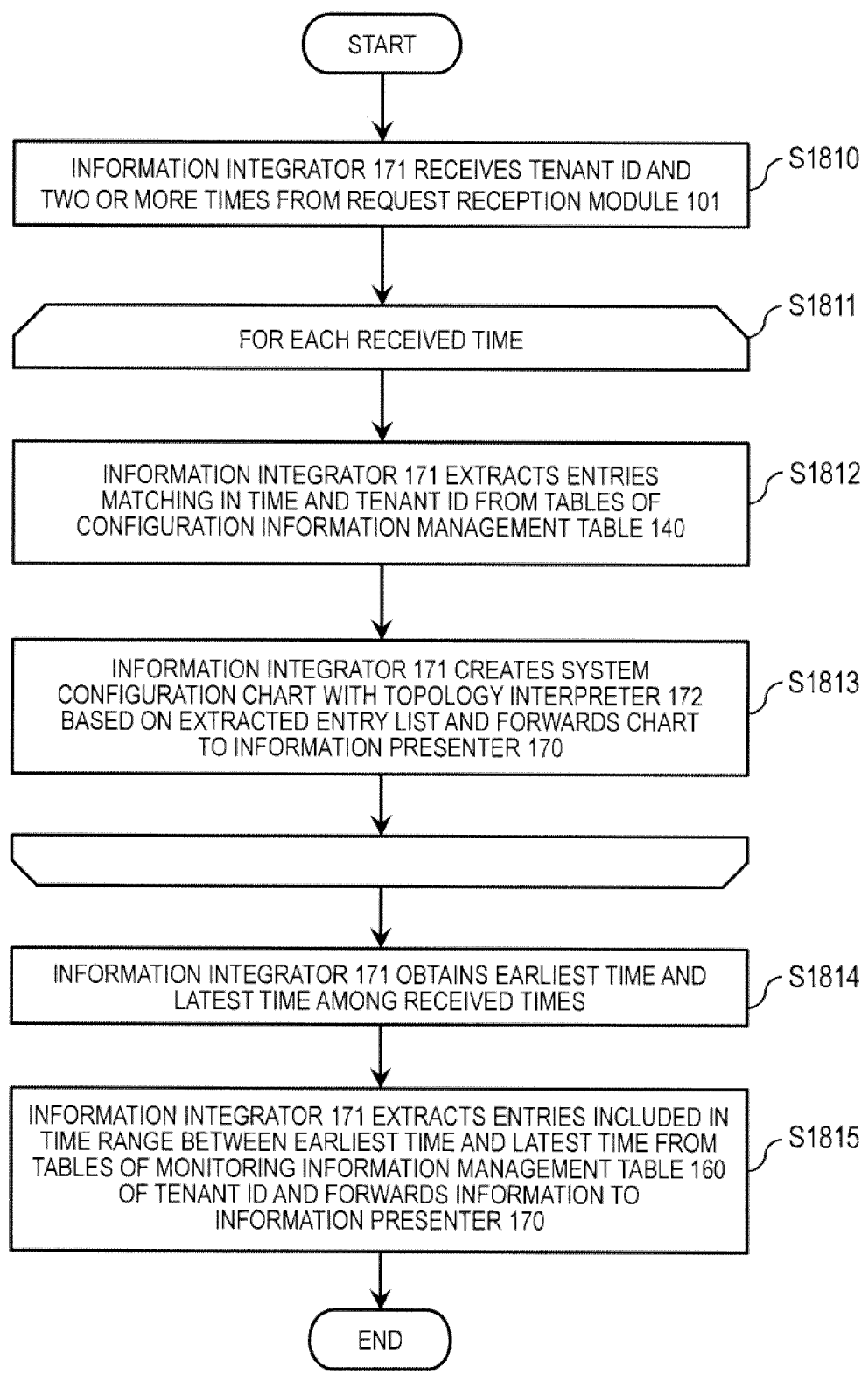
FIG. 18 is a flowchart of processing of an output module.

FIG. 18 is a flowchart illustrating the details of Step S1212. This processing narrows down the monitoring information for each of the configuration information, event information, log information, and performance information and displays the results on the screen. First, the information integrator 171 receives a tenant ID and two or more times from the request reception module 101. Next, the information integrator 171 executes Steps S1812 and S1813 for each of the designated two or more times. At Step S1812, the information integrator 171 extracts all the components and connections from the configuration information management tables 140 based on the time and the tenant ID. At Step S1813, the topology interpreter 172 creates a system configuration chart based on the information extracted at Step S1812 and transfers the chart to the information presenter 170.

Next, the information integrator 171 determines the earliest time and the latest time among the times provided at Step S1810 (Step S1814), identifies a monitoring information management table 160 with the tenant ID provided at Step S1810, extracts entries within the provided time range from the performance information table 161, the event information table 162, and the log information table 163 included in the monitoring information management table 160, and forwards the results to the information presenter. Through this processing, configuration information, performance information, event information, and log information tied with times can be displayed.

Although the above-described processing forwards all data on the designated tenant and in the designated time range to the information presenter, only the data predetermined by the administrator may be displayed. This arrangement can be achieved by providing an indication setting column to specify whether to indicate the information to the monitoring specification table 150, setting the value by the administrator through the request reception module prior to the monitoring result display request, and narrowing down the extracted entries in accordance with the indication setting column at Step S1815.

Although the processing of FIG. 18 displays data in the time range between the designated times, the times to display configuration information may be designated separately from this time range. Step S1810 accepts designation of the current time for the latest state. In this case, the configuration information management table 140 does not hold demanded data; accordingly, the processing may include another step subsequent to Step S1810 to invoke the configuration management module 104 to hold the latest data.

Figure 20:
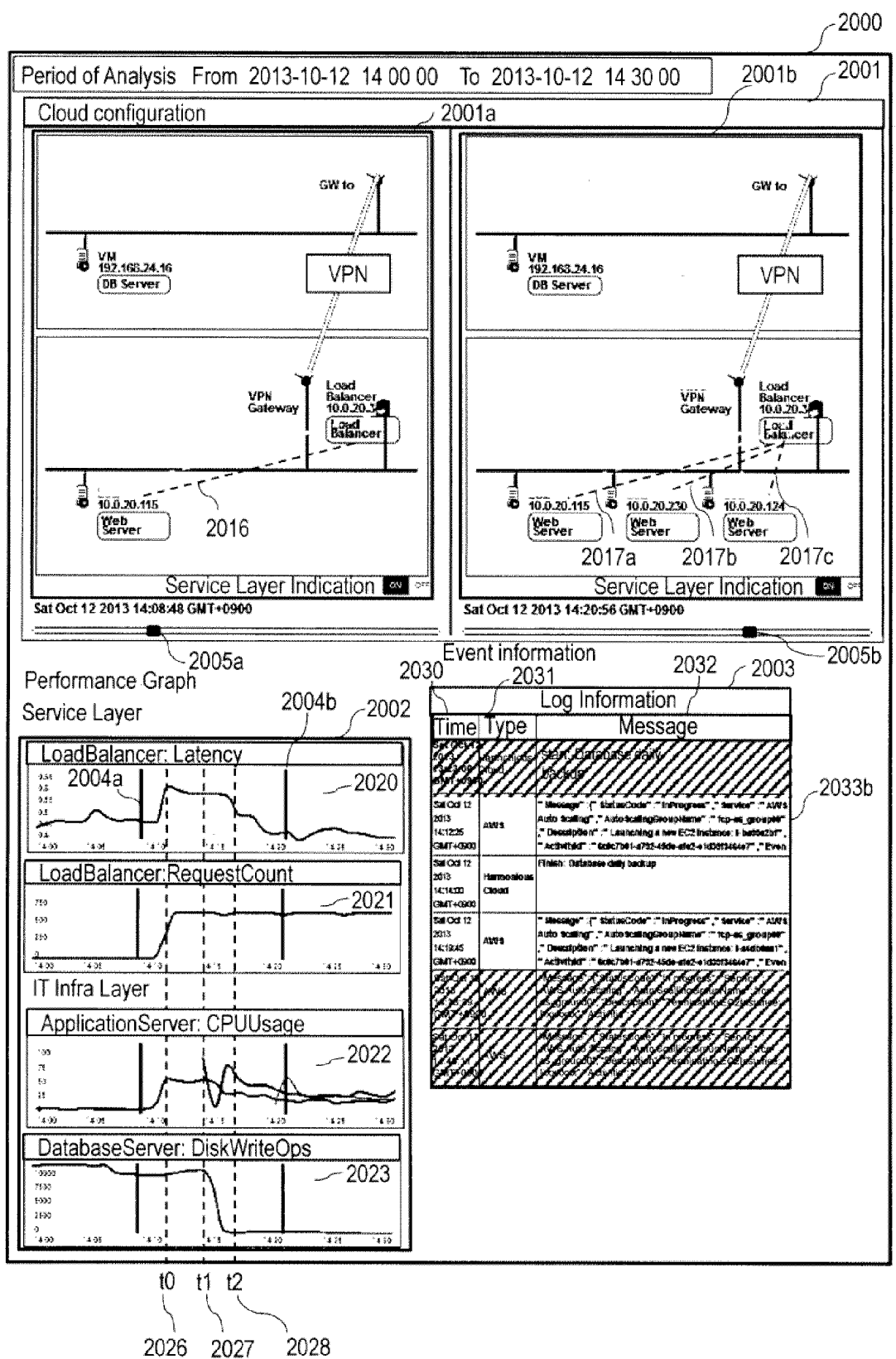
FIG. 20 is an example of a screen image indicating monitoring results of an integrated management system.

FIG. 20 is an example of a screen image 2000 provided by the integrated manager 100. This screen image 2000 is created by the output module 103 and displayed on the management terminal 180. The screen image 2000 is composed of, for example, a configuration information display section 2001, a performance information display section 2002, an event and log information display section 2003 and these display sections are laid out in the same screen image. The configuration information display section 2001 is divided into two or more subsections; the subsections can indicate configuration information at different times using topologies. In the example of FIG. 20, a configuration information display section 2001a and a configuration information display section 2001b display configuration information at different times. The times of information to be indicated in the subsections can be designated with the time designation bars 2005a and 2005b. The configuration information display section 2001 displays information in a graph structure which shows the components belonging to the tenant as nodes and the connections in the network as edges. Furthermore, the section 2001 can indicate the dependencies of the service layers (such as an application layer and a middleware layer) specified by the administrator over the graphs (2016, 2017a, 2017b, 2017c).

The performance information display section 2002 displays performance information acquired through the output module 103. The performance information is displayed in the form of separate performance graphs 2020 to 2023 for individual monitoring target components and monitoring metrics. The graphs are vertically aligned, for example. The horizontal axes of the performance graphs 2020 to 2023 are the time; the time axes are common to all the performance graphs 2020 to 2023. The markers 2004a and 2004b in the performance graphs 2020 to 2023 move with the times of the configuration information 2001a and 2001b.

The event and log information display section 2003 displays event and log information acquired through the output module 103. The event and log information display section 2003 can be formed as a table including a time column 2030, a type column 2031, and a value column 2032. The entries of this table are indicated in order of time series. In this event and log information display section 2003, the entries in the time range designated by the time designation bars 2005a and 2005b are highlighted.

Next, an actual use of this screen image by the administrator is described. The administrator founds a drop in performance at time t0 (2026) with reference to the performance information graph 2020. To check the configuration information before the drop in performance, the administrator displays configuration information at the time t0 (2026). Next, the administrator displays the configuration at time t1 (2027) after the performance drop on the same screen. The administrator finds that two virtual machines corresponding to web servers have been increased but the performance has not improved. Advancing the time to analyze the cause, the administrator finds that the performance has improved after time t2 (2028). At this time, another performance graph (2023) of the database server indicates significant improvement in performance so that the administrator can presume that the database server is the cause. The administrator hence refers to the event section (2003) and finds an event of completion of backup operation in line 2033c; accordingly, the administrator determines that the cause is the delay in backup operation.

The above-described processing can store configurations at a plurality of times of a service system created in a multi-tenancy information processing system and the monitoring information under the individual configurations; accordingly, when a failure occurs in the service system, differences in the system configuration as of different times can be compared. Even if the service system is created across a plurality of information processing systems, the connections among the information processing systems are calculated to overview the overall configuration of the service system. Furthermore, since a single screen can indicate the system configurations as of different times of the service system created in a multi-tenancy information processing system and monitoring information under the individual system configurations, the cause of failure occurred in the service system can be speedily determined.

Second Embodiment

Figure 21:
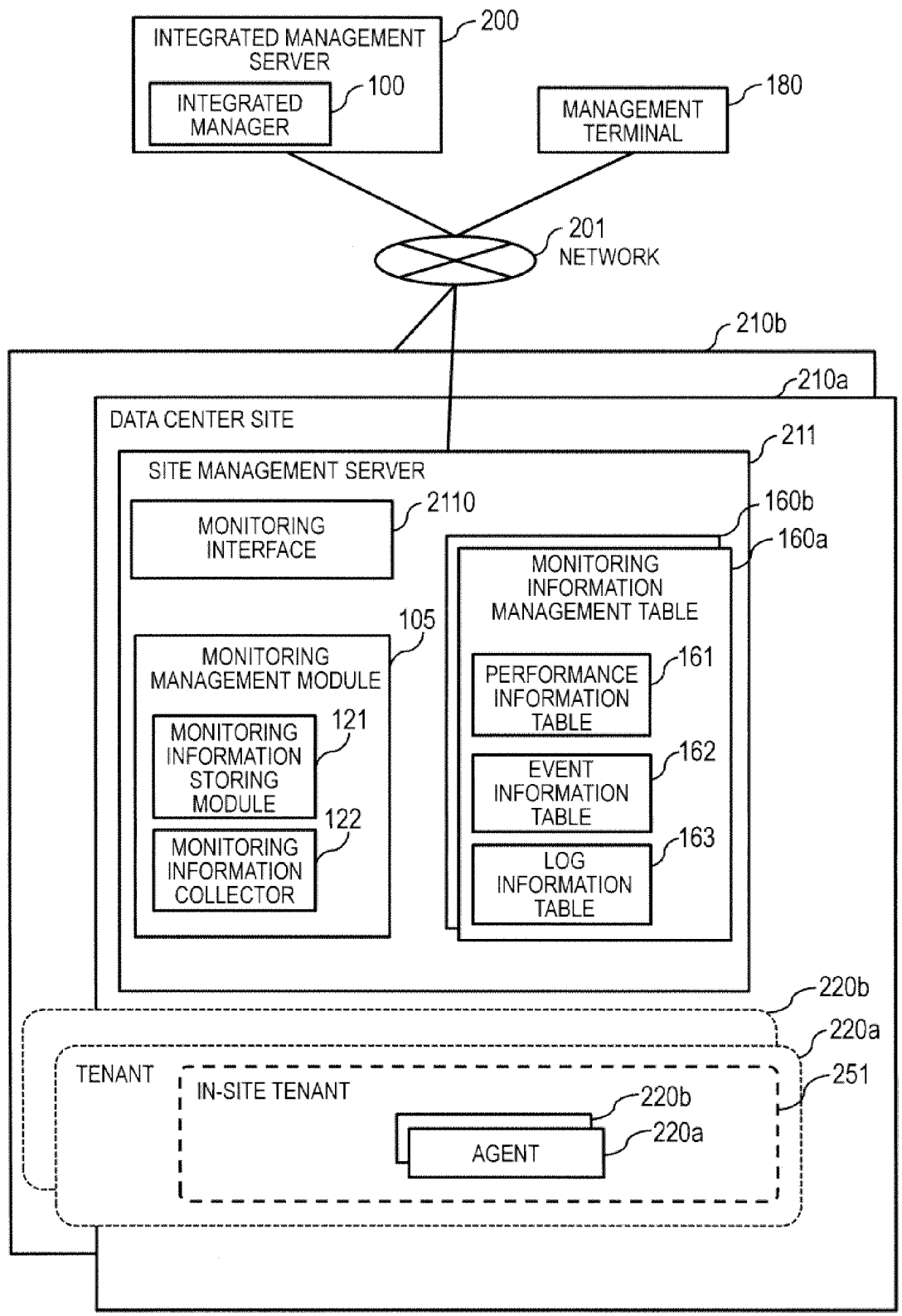
FIG. 21 illustrates a system configuration in the second embodiment of this invention.

FIG. 21 illustrates an example of a system configuration in the second embodiment of this invention. Unlike the first embodiment, this embodiment stores data collected through monitoring in individual data center site 210. For this reason, the monitoring management module 105 and the monitoring information management tables 160 in the first embodiment are located in the site management server 211 and accordingly, a monitoring interface 2110 for connecting the integrated manager 100 and a monitoring management module 105 is newly provided. The integrated manager 100 in the second embodiment does not include the monitoring management module 105 and the monitoring information management tables 160, compared to the integrated manager 100 in the first embodiment; the drawing of the integrated manager 100 is omitted.

In the second embodiment, component IDs are not assigned to agents 108. Instead, the information integrator 171 converts the site-provided component IDs to component IDs. Accordingly, the structure of the performance information table and the processing of the integrated displaying need modification.

Figure 23:
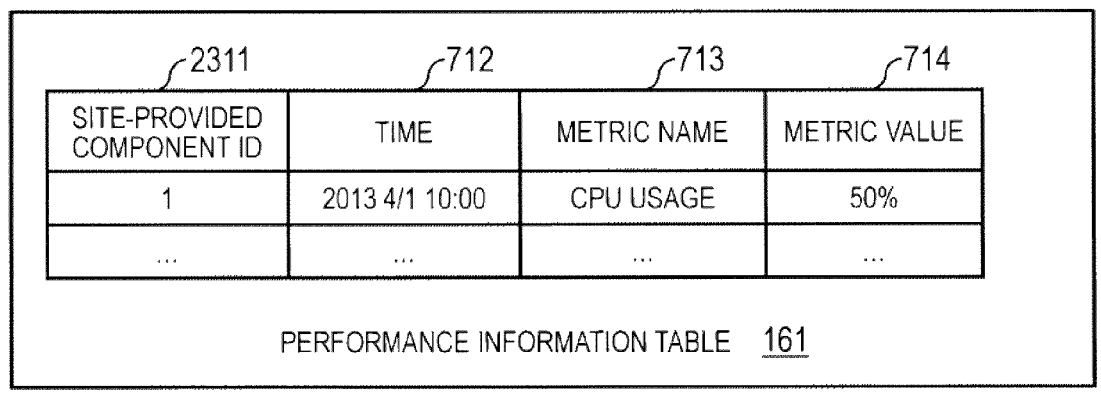
FIG. 23 illustrates a configuration example of a performance information table in the second embodiment of this invention.

FIG. 23 is a modified example of the performance information table 161. This performance information table 161 includes a site-provided component ID column 2311 instead of the component ID column 711. The configurations of the other columns are not changed; accordingly, the description thereof is omitted. The modifications of the event information table and the log information are the same; the description and drawings of these tables are omitted.

Figure 22:
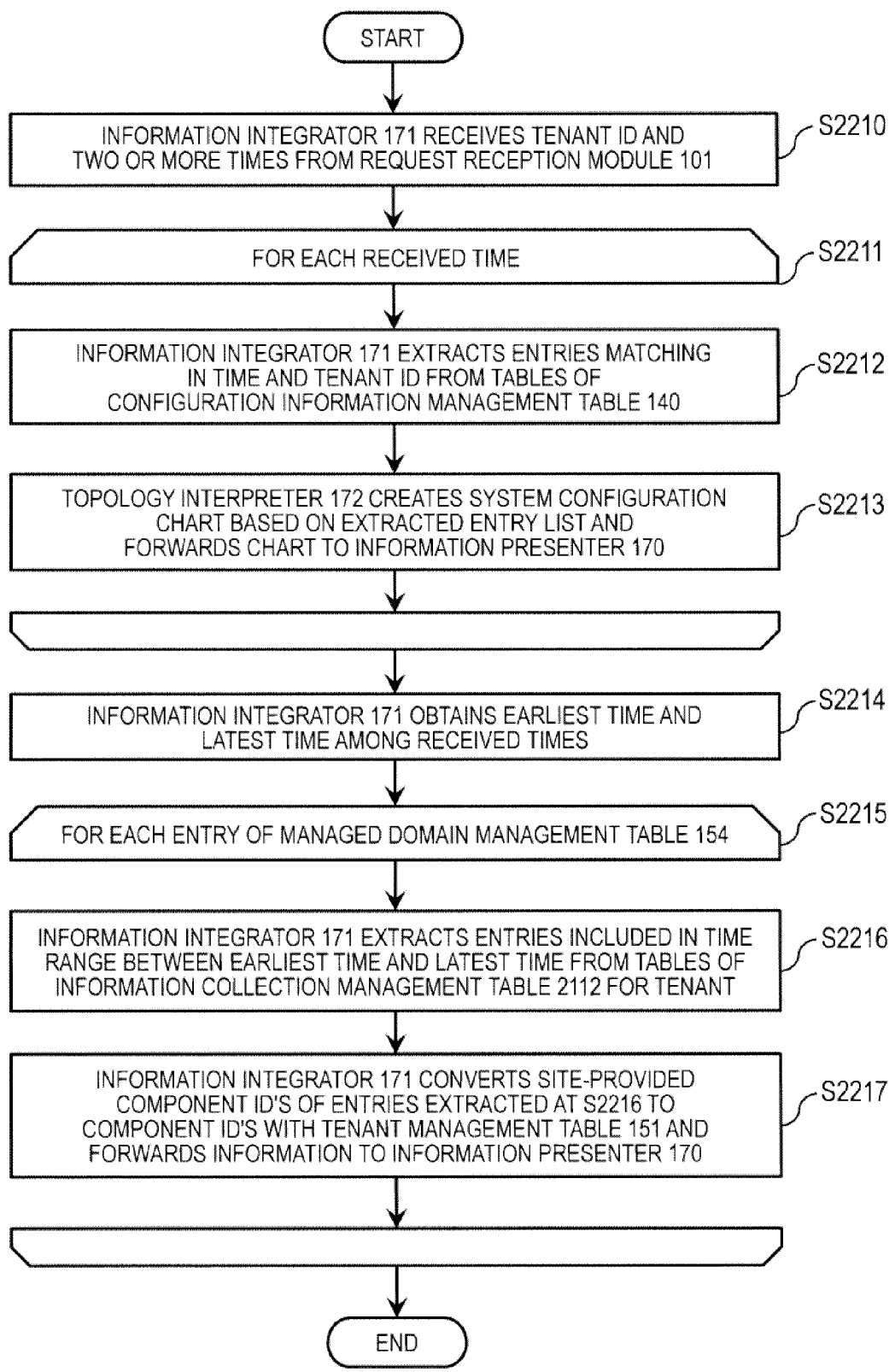
FIG. 22 is a flowchart of processing of an output module in the second embodiment of this invention.

FIG. 22 illustrates modified processing of integrated displaying. The Steps S2210 to S2214 are the same as Steps S1810 to S1814 in FIG. 18. This processing has been changed so that extraction of performance information, event information, and log information at Step S1815 is performed in individual data center sites using the managed domain management table 154 (S2215, S2216). Also, compared to the processing in FIG. 18, a new step (S2217) of converting a site-provided component ID into a component ID in forwarding the processing result to the information presenter 170.

This processing can be applied to a data center site which is not originally managed by the integrated manager 100 and stores data independently in the monitoring information management tables 160 in the site management server 211. This processing allows the integrated manager 100 to additionally manage a tenant after the tenant starts operation.

For a service system created on a multi-tenant information processing system distributed to a plurality of data center sites, this processing enables distributed storage of monitoring information under different configurations as of different times in the individual monitoring sites. Meanwhile, matching of the identifiers of tenants and the components of each tenant is performed at the integrated manager; this invention can be easily applied to a data center site which has already started operating.

It should be noted that this invention is not limited to the above-described embodiments but include various modifications. For example, the above-described embodiments have described details in order to describe this invention for better understanding; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing modules, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that most of all components are actually interconnected.

What is claimed is:

1. A management server for managing a service system virtually built by using a plurality of components provided by one or more data centers, the management server being connected with a management terminal and the one or more data centers and comprising:
a processor configured to:
assign identifiers unique to the service system to components connected via a network among the plurality of components used to build the service system, and record each of the identifiers associated with connection information indicating a connection with another component assigned one of the identifiers and a time of the building of the service system;
record, upon detection of a change in the components included in the service system or a change in the connections of the components, the identifier of the changed component associated with connection information indicating the changed connection and a time of the change of the connection;
collect monitoring information indicating operation conditions of the components assigned the identifiers and monitoring times, which are times of creation of the monitoring information, from the one or more data centers;
record the monitoring information associated with the monitoring times; and
identify and output, upon receipt of information designating a time from the management terminal, connection information and monitoring information on the service system as of the designated time based on the identifiers of the components associated with the designated time.

2. The management server according to claim 1, wherein the processor is further configured to display an image indicating the configuration of the service system as of the designated time and the monitoring information as of the designated time in a single screen of the management terminal based on the identified connection information and identified monitoring information.

3. The management server according to claim 2, wherein the image indicating the configuration of the service system is expressed by a graph structure in which nodes represent the components and edges represent the connections between components.

4. The management server according to claim 1, wherein the monitoring information includes performance information, log information, and event information.

5. The management server according to claim 1, wherein the processor is further configured to:
display a graph image showing variation in performance of the components along a time axis based on the monitoring information on an screen of the management terminal; and
identify and output, upon receipt of information designating a time corresponding to a point on the time axis, the connection information and monitoring information on the service system as of the designated time based on the identifies of the components associated with the designated time.

6. The management server according to claim 1, wherein, in building the service system, the processor is further configured to:
receive design information to build the service system from the management terminal; and
create the connection information based on the received design information.

7. The management server according to claim 1, wherein the processor is further configured to:

deploy agents to the components connected via the network;
set the identifiers of the components in which the agents are deployed to the agents; and
receive the identifiers set to the agents from the agents together with the monitoring information.

8. The management server according to claim 1, wherein the processor is further configured to:
assign identifiers unique to the management server to a plurality of service systems;
record the identifiers of the plurality of components included in each of the plurality of service systems associated with the identifier of the corresponding service system; and
upon receipt of information designating the identifier of a service system and a time, identify and output the identifiers of components and connection information of the components associated with the designated time among the identifiers of the components and connection information of the components included in the service system identified with the designated identifier.

9. A control method of a management server for managing a service system virtually built by using a plurality of components provided by one or more data centers, the management server being connected with a management terminal and the one or more data centers, the control method comprising:
assigning, by the management server building the service system, identifiers unique to the service system to components connected via a network among the plurality of components used to build the service system and further recording each of the identifiers associated with connection information indicating a connection with another component assigned one of the identifiers and a time of the building the service system;
recording, by the management server that has detected a change in the components included in the service system or a change in the connections of the components, the identifier of the changed component associated with connection information indicating the changed connection and a time of the change of the connection;
collecting, by the management server, monitoring information indicating operation conditions of the components assigned the identifiers and monitoring times, which are times of creation of the monitoring information, from the one or more data centers;
recording, by the management server, the monitoring information associated with the monitoring times; and
identifying and outputting, by the management server that has received information designating a time from the management terminal, connection information and monitoring information on the service system as of the designated time based on the identifiers of the components associated with the designated time.

10. The control method of the management server according to claim 9, further comprising displaying, by the management server, an image indicating the configuration of the service system as of the designated time and the monitoring information as of the designated time in a single screen of the management terminal based on the identified connection information and identified monitoring information.

11. The control method of the management server according to claim 9, wherein the monitoring information includes performance information, log information, and event information.

12. The control method of the management server according to claim 9, further comprising:
   displaying, by the management server, a graph image showing variation in performance of the components along a time axis based on the monitoring information on an screen of the management terminal; and
   identifying and outputting, by the management server that has received information designating a time corresponding to a point on the time axis, the connection information and monitoring information on the service system as of the designated time based on the identifies of the components associated with the designated time.

13. The control method of the management server according to claim 9, further comprising:
   receiving, by the management server building the service system, design information to build the service system from the management terminal and further creating the connection information based on the received design information.

14. The control method of the management server according to claim 9, further comprising:
   deploying, by the management server, agents to the components connected via the network;
   setting, by the management server, the identifiers of the components in which the agents are deployed to the agents; and
   receiving, by the management server, the identifiers set to the agents from the agents together with the monitoring information.

15. The control method of the management server according to claim 9, further comprising:
   assigning, by the management server, identifiers unique to the management server to a plurality of service systems;
   recording, by the management server, the identifiers of the plurality of components included in each of the plurality of service systems associated with the identifier of the corresponding service system; and
   identifying and outputting, by the management server that has received information designating the identifier of a service system and a time, the identifiers of components and connection information of the components associated with the designated time among the identifiers of the components and connection information of the components included in the service system identified with the designated identifier.

* * * * *